United States Patent
Sonoura et al.

(10) Patent No.: US 10,011,439 B2
(45) Date of Patent: Jul. 3, 2018

(54) TRANSPORTER AND TRANSPORT METHOD

(71) Applicant: Kabushiki Kaisha Toshiba, Minato-ku (JP)

(72) Inventors: Takafumi Sonoura, Yokohama (JP); Akihito Ogawa, Fujisawa (JP); Hideichi Nakamoto, Setagaya (JP); Haruna Eto, Arakawa (JP); Junya Tanaka, Ota (JP); Atsushi Sugahara, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/425,271

(22) Filed: Feb. 6, 2017

(65) Prior Publication Data

US 2018/0072512 A1 Mar. 15, 2018

(30) Foreign Application Priority Data

Sep. 14, 2016 (JP) .................................. 2016-179642

(51) Int. Cl.
*B65G 47/68* (2006.01)
*B65G 47/88* (2006.01)
(Continued)

(52) U.S. Cl.
CPC ......... *B65G 47/8815* (2013.01); *B65G 15/00* (2013.01); *B65G 41/003* (2013.01); *B65G 47/643* (2013.01)

(58) Field of Classification Search
CPC ...... B65G 15/00; B65G 41/005; B65G 13/02; B65G 39/06
(Continued)

(56) References Cited

U.S. PATENT DOCUMENTS 3,403,799 A * 10/1968 Sindzinski ............. B65G 47/57
198/435
4,867,299 A * 9/1989 Fukuoka ............... B65G 47/643
198/435
(Continued)

FOREIGN PATENT DOCUMENTS

JP 2-88922 U 7/1990
JP 5-178463 A 7/1993
(Continued)

*Primary Examiner* — James R Bidwell
(74) *Attorney, Agent, or Firm* — Oblon, McClelland, Maier & Neustadt, L.L.P.

(57) ABSTRACT

According to one embodiment, a transporter includes a conveyor, a restrainer, and a restrainer moving unit. The conveyor conveys an object in a first direction. The conveyor is movable in a second direction. The restrainer is disposed corresponding to a downstream end of the conveyor in the first direction. The restrainer moving unit keeps, in a case where a position of the conveyor relative to an object-transporting destination is out of a preset range, the restrainer at a restraining position at which the restrainer restrains a movement of the object. The restrainer moving unit starts to move, in a case where the position of the conveyor relative to the object-transporting destination is in the preset range, the restrainer toward a releasing position at which the restrainer allows the movement of the object.

19 Claims, 9 Drawing Sheets

(51) Int. Cl.
*B65G 15/00* (2006.01)
*B65G 41/00* (2006.01)
*B65G 47/64* (2006.01)

(58) Field of Classification Search
USPC .............................. 198/345.3, 435; 193/35 A
See application file for complete search history.

(56) References Cited

U.S. PATENT DOCUMENTS

| | | | |
|---|---|---|---|
| 5,205,703 A | 4/1993 | Shill et al. | |
| 6,390,278 B1* | 5/2002 | Brown | B65G 47/647 193/35 SS |
| 6,976,573 B2* | 12/2005 | Brixius | B65G 47/57 198/435 |
| 7,699,158 B2* | 4/2010 | Aust | B65G 47/643 198/369.1 |
| 8,342,311 B2* | 1/2013 | Philipp | B65G 47/5154 198/345.1 |
| 2017/0129707 A1 | 5/2017 | Nakamoto et al. | |

FOREIGN PATENT DOCUMENTS

| | | |
|---|---|---|
| JP | 5-193765 A | 8/1993 |
| JP | 9-202451 A | 8/1997 |
| JP | 10-279012 A | 10/1998 |
| JP | 2016-55995 A | 4/2016 |
| JP | 2017-088279 A | 5/2017 |

* cited by examiner

TRANSPORTER AND TRANSPORT METHOD

CROSS-REFERENCE TO RELATED APPLICATION

This application is based upon and claims the benefit of priority from Japanese Patent Application No. 2016-179642 filed on Sep. 14, 2016, the entire contents of which are incorporated herein by reference.

FIELD

Embodiments described herein relate generally to a transporter and a transport method.

BACKGROUND

In recent years, the field of logistics has increasingly needed work automation. Therefore, a transporter for unloading a cargo from a pallet has been proposed.

It is desired to improve transport efficiency in the above-described transporter.

DETAILED DESCRIPTION

Figure 1:
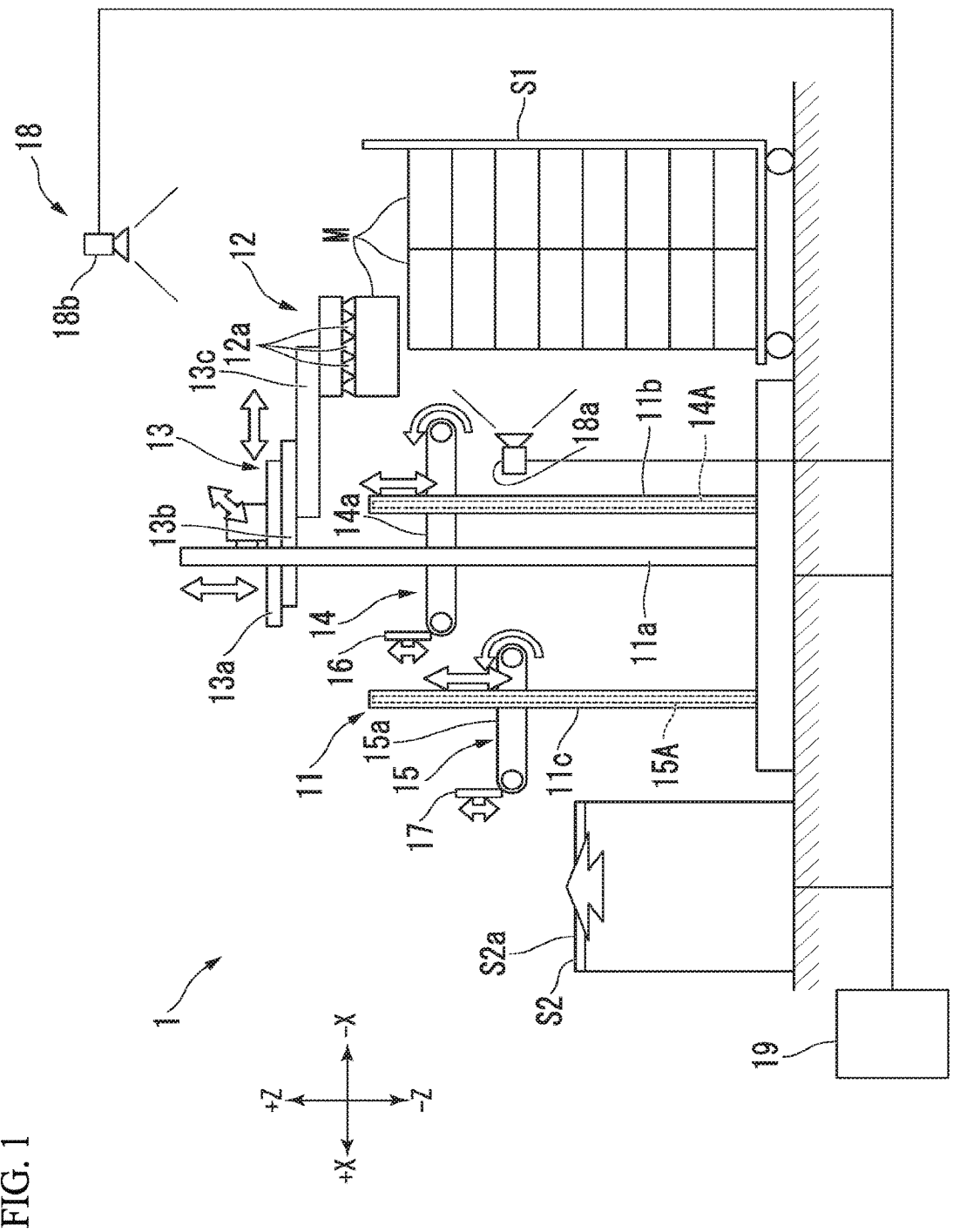
FIG. 1 is a side view showing a transporter according to a first embodiment.

According to one embodiment, a transporter includes a conveyor, a restrainer, and a restrainer moving unit. The conveyor conveys an object in a first direction. The conveyor is movable in a second direction that is different from the first direction. The restrainer is disposed corresponding to a downstream end of the conveyor in the first direction. The restrainer moving unit keeps, in a case where a position of the conveyor, in the second direction, relative to an object-transporting destination is out of a preset range, the restrainer at a restraining position at which the restrainer restrains a movement of the object. The restrainer moving unit starts to move, in a case where the position of the conveyor, in the second direction, relative to the object-transporting destination is in the preset range, the restrainer toward a releasing position at which the restrainer allows the movement of the object.

Hereinafter, a transporter and a transport method according to embodiments will be described with reference to the drawings. In the following description, the same reference numerals will be given to configurations having the same or similar functions. A redundant description thereof may be omitted.

First Embodiment

A first embodiment will be described with reference to FIGS. 1 to 3.

FIG. 1 is a side view showing a transporter 1 according to the present embodiment.

As shown in FIG. 1, the transporter 1 is an automatic unloading device, for example. The transporter 1 takes out an object (i.e., object to be conveyed, or object to be held) M placed on an object-transporting departure S1 (e.g., unloading section, i.e., first load section), and moves the object M to an object-transporting destination S2 (e.g., object supply destination, i.e., second load section). The transporter 1 may be referred as "cargo handling apparatus". The object M conveyed by the transporter 1 is not limited to a cargo (e.g., a packaged baggage) and may be components on a manufacturing line. The transporter 1 and the transport method of the embodiment can be widely applied to a logistic automatic supply device, an object supply apparatus of factory, or the like.

In the present embodiment, an example of the object-transporting departure S1 is a box pallet. On the other hand, an example of the object-transporting destination S2 is a belt conveyor. Therefore, hereinafter, for the convenience of description, the object-transporting departure S1 may be referred to as a "box pallet S1", and the object-transporting destination S2 may be referred to as a "transport conveyor S2". However, each of the object-transporting departure S1 and the object-transporting destination S2 is not limited to the above-described example and may be any one of a belt conveyor, a carrier, a pallet, and a workbench, for example. The object-transporting departure S1 has at least a position (i.e., an object-transporting departure position). The object-transporting departure S1 may be a tangible element. The object-transporting departure S1 may be an object-transporting departure structure which has a surface or the like as the object-transporting departure position, for example. Similarly, the object-transporting destination S2 has at least a position (i.e., an object-transporting destination position). The object-transporting destination S2 may be a tangible element. The object-transporting destination S2 may be an object-transporting destination structure which has a surface or the like as the object-transporting destination position, for example.

Herein, for the convenience of description, a +X-direction, a −X-direction, a +Y-direction, a −Y-direction, a +Z-direction, and a −Z-direction will be defined as follows. For example, the +X-direction, the −X-direction, the +Y-direction, and the −Y-direction are directions along a substantially horizontal plane. The +X-direction is a direction from the transporter 1 toward the object-transporting destination S2. The +X-direction may be referred to as a "transport direction". The −X-direction is a direction opposite to the +X-direction. The +Y-direction and the −Y-direction are directions crossing (e.g., directions substantially orthogonal to) the +X-direction, and represent a width direction of the object M, for example. The −Y-direction is a direction opposite to the +Y-direction. The +Z-direction and the −Z-direction are directions crossing (e.g., directions substantially orthogonal to) the +X-direction and the +Y-direction. The +Z-direction is a substantially vertically upward direction, for example. The −Z-direction is a direction opposite to the +Z-direction, and is a substantially vertically downward direction, for example. Hereinafter, in a case where the +Z-direction and the −Z-direction are not particularly distinguished from each other, both of these will be simply referred to as a Z-direction.

"Upstream" and "downstream" in the following description respectively mean "upstream" and "downstream" in the transport direction (+X-direction) of the object M.

As shown in FIG. 1, the transporter 1 includes a base 11, a holder 12, a holder moving unit 13, a first conveyor 14, a first conveyor moving unit 14A, a second conveyor 15, a second conveyor moving unit 15A, a first restraining unit 16, a second restraining unit 17, an object detector 18, and a controller 19.

The base (e.g., main frame) 11 is installed on a floor surface, for example. The base 11 includes a plurality of supports 11a, 11b, and 11c extending along the +Z-direction. The plurality of supports 11a, 11b, and 11c include a pair of first supports 11a, a pair of second supports 11b, and a pair of third supports 11c. The pair of first supports 11a supports the holder moving unit 13. The pair of second supports 11b supports the first conveyor 14. The pair of third supports 11c supports the second conveyor 15. The configuration of the base 11 is not limited to the above-described example.

The holder (e.g., grasping mechanism, or hand device) 12 is an end effector which can hold the object M. An example of the holder 12 includes a plurality of suction pads 12a connected to a vacuum pump, and an electromagnetic valve which controls a suction operation of the suction pads 12a. The holder 12 holds (e.g., grasps) the object M by the suction pads 12a coming into contact with the object M and vacuum suction being performed with the suction pads 12a. The holder 12 is not limited to the above-described example using the vacuum suction, and may be a holder which holds the object M, for example pinching the object M or using other mechanism. The term of "grasping" described herein is used in a broad sense of "holding the object", and is not limited to a meaning of "gripping".

The holder moving unit (i.e., positioning mechanism, e.g., arm device) 13 is an orthogonal robot arm, and is an example of a multiple jointed arm mechanism, for example. The holder moving unit 13 includes a first member 13a, a second member 13b, and a third member 13c, for example. The first member 13a is movable (e.g., movable up and down) in the +Z-direction and the −Z-direction while being guided by guides provided on the first supports 11a of the base 11. The second member 13b is movable in the +Y-direction and the −Y-direction while being supported and guided by the first member 13a. The third member 13c is movable in the +X-direction and the −X-direction while being supported and guided by the second member 13b. The above-described holder 12 is attached to an end of the holder moving unit 13. In this manner, the holder moving unit 13 can move the holder 12 to a desired three-dimensional position. The configuration of the holder moving unit 13 is not limited to the above-described example. For example, the holder moving unit 13 may have a posture rotation shaft for rotating a posture of the holder 12 so as to be capable of handling inclined stacking of the object M.

The above-described holder 12 is moved toward the box pallet S1 by the holder moving unit 13 so as to hold the object M placed in the box pallet S1. In addition, the holder 12 is moved by the holder moving unit 13 so as to deliver the object M held by the holder 12 to the first conveyor 14. In a state where the object M has been moved to the first conveyor 14, the holder 12 releases the object M. In this manner, the holder 12 moves the object M placed in the box pallet S1 to the first conveyor 14.

The transporter 1 includes an area sensor disposed with a certain distance above an upper surface 14a of the first conveyor 14, for example. The area sensor detects the object M moving close to the upper surface 14a of the first conveyor 14. In this manner, the transporter 1 allows the object M held by the holder 12 to move down without colliding with the vicinity of the upper surface 14a of the first conveyor 14, and can safely unload the object M. Instead of the area sensor, the transporter 1 may utilize other sensors such as an optical camera and a contact sensor so as to detect the object M which moves close to or comes into contact with the upper surface 14a of the first conveyor 14.

The first conveyor 14 is disposed between the box pallet S1 and the transport conveyor S2 in the +X-direction. The first conveyor 14 is a belt conveyor, for example. The first conveyor 14 has the upper surface (i.e., transport surface, e.g., belt surface) 14a which moves toward the transport conveyor S2. For example, the upper surface 14a can convey the object M while the position of the first conveyor 14 is unchanged. The first conveyor 14 receives the object M delivered by the holder 12, and conveys the object M in the +X-direction. The +X-direction is an example of a "first direction".

The first conveyor 14 according to the present embodiment is a lift conveyor which is movable (e.g., movable up and down) in the +Z-direction and the −Z-direction. For example, the first conveyor 14 is guided by guides provided on the second supports 11b of the base 11, and is driven by the first conveyor moving unit 14A including a motor and a ball screw, thereby moving in the +Z-direction and the −Z-direction. Each of the +Z-direction and the −Z-direction is an example of a "second direction". Each of the +Z-direction and the −Z-direction is a direction crossing (e.g., a direction substantially orthogonal to) the upper surface 14a of the first conveyor 14. Independently of the holder 12, the first conveyor 14 is movable in the +Z-direction and the −Z-direction. The first conveyor 14 is moved to a desired position in the Z-direction in accordance with a loaded height of the object M in the box pallet S1 (i.e., height at which the holder 12 unloads the object M), for example. The term of "movable in the second direction" described herein includes that the first conveyor 14 obliquely moves in the second direction. This definition is similarly applied to the second conveyor 15. In addition to the +Z-direction and the −Z-direction, the first conveyor 14 may be movable in the +X-direction, the −X-direction, the +Y-direction, and the −Y-direction.

The second conveyor 15 is disposed between the first conveyor 14 and the transport conveyor S2 in the +X-direction. The second conveyor 15 is a belt conveyor, for example. The second conveyor 15 has an upper surface (i.e., transport surface, e.g., belt surface) 15a which moves toward the transport conveyor S2. For example, the upper surface 15a can convey the object M in a state where the position of the second conveyor 15 is unchanged. The second conveyor 15 receives the object M conveyed by the first conveyor 14 from the first conveyor 14, and conveys the object M in the +X-direction. Then, the second conveyor 15 delivers the object M conveyed by the second conveyor 15 to the transport conveyor S2.

The second conveyor 15 according to the present embodiment is a lift conveyor which is movable (e.g., movable up and down) in the +Z-direction and the −Z-direction. For example, the second conveyor 15 is guided by guides provided in the third supports 11c of the base 11, and is driven by the second conveyor moving unit 15A including a motor and a ball screw, thereby moving in the +Z-direction and the −Z-direction. Each of the +Z-direction and the −Z-direction is a direction crossing (e.g., a direction substantially orthogonal to) the upper surface 15a of the second conveyor 15. Independently of the holder 12 and the first conveyor 14, the second conveyor 15 is movable in the +Z-direction and the −Z-direction. The second conveyor 15 is moved to a desired position in the Z-direction so that the height of the upper surface 15a of the second conveyor 15 is aligned with the height of the upper surface 14a of the first conveyor 14, for example. The second conveyor 15 receives the object M from the first conveyor 14 in a state where the upper surface 15a of the second conveyor 15 and the upper surface 14a of the first conveyor 14 are located at substantially the same height. In addition, the second conveyor 15 is moved to a desired position in the Z-direction so that the height of the upper surface 15a of the second conveyor 15 is aligned with the height of an upper surface (i.e., transport surface, e.g., belt surface) S2a of the transport conveyor S2. The second conveyor 15 delivers the object M to the transport conveyor S2 in a state where the upper surface 15a of the second conveyor 15 and the upper surface S2a of the transport conveyor S2 are located at substantially the same height. In addition to the +Z-direction and the −Z-direction, the second conveyor 15 may be movable in the +X-direction, the −X-direction, the +Y-direction, and the −Y-direction.

Each of the first conveyor 14, the second conveyor 15, and the transport conveyor S2 is not limited to the belt conveyor. Each of the first conveyor 14, the second conveyor 15, and the transport conveyor S2 may be a roller conveyor including a plurality of actively rotating rollers. In this case, the upper surfaces (i.e., transport surfaces) 14a, 15a, and S2a described herein mean virtual surfaces connecting upper end apexes of the plurality of rollers.

The first restraining unit 16 is disposed between the first conveyor 14 and the second conveyor 15. The first restraining unit 16 restrains the movement of the object M transferred from the first conveyor 14 to the second conveyor 15. On the other hand, the second restraining unit 17 is disposed between the second conveyor 15 and the transport conveyor S2. The second restraining unit 17 restrains the movement of the object M transferred from the second conveyor 15 to the transport conveyor S2. The first restraining unit 16 and the second restraining unit 17 will be described in detail later.

The object detector (e.g., object recognizing device) 18 acquires information relating to a position of the object M that is placed in the box pallet S1. The object detector 18 is an example of an "information acquiring unit". The object detector 18 is a recognizing device including a three-dimensional sensor, for example.

According to the present embodiment, the object detector 18 includes a first sensor 18a and a second sensor 18b. Each of the first sensor 18a and the second sensor 18b is a three-dimensional distance image sensor, for example. The first sensor 18a is disposed on a front side of the box pallet S1 so as to acquire camera image information and depth information in a view from the front side of the box pallet S1. The second sensor 18b is disposed above the box pallet S1 so as to acquire camera image information and depth information in a view from above of the box pallet S1. According to the information acquired by the first sensor 18a and the second sensor 18b the object detector 18 detects a position, a shape, or a height of a top surface of the object M that is placed in the box pallet S1.

A type or an arrangement of the first sensor 18a and the second sensor 18b is not limited to the above-described example. The sensor may have a fixed position, or may have a changeable position. For example, the sensor may be configured so that the sensor itself moves in a case where all of the objects M do not fit within an angle of view.

In addition, the object detector 18 is not limited to the above-described example. The object detector 18 may be an information acquiring unit which acquires information such as the position, the shape, or the height of the top surface of the object M from a camera image when the object M is loaded in the box pallet S1, information stored in an IC tag attached to the object M, or trajectory information of a robot when the object M is loaded in the box pallet S1. For example, these pieces of information may be stored in a database to which the transporter 1 is accessible. In addition, the term of "acquiring information" described herein includes a case of passively acquiring information without being limited to a case of actively acquiring information.

The controller (e.g., control circuit) 19 controls overall operations of the transporter 1. That is, the controller 19 controls various operations of the holder 12, the holder moving unit 13, the first conveyor 14, the first conveyor moving unit 14A, the second conveyor 15, the second conveyor moving unit 15A, and the object detector 18.

Each of the object detector 18 and the controller 19 is entirely or partially realized by a circuit board including a processor such as a central processing unit (CPU), for example. Each of the object detector 18 and the controller 19 is entirely or partially a software function module realized by causing the processor such as the CPU to execute a program stored in a memory of the circuit board, for example. Alternatively, each of the object detector 18 and the controller 19 may be entirely or partially realized by hardware such as a large scale integration (LSI), an application specific integrated circuit (ASIC), or a field-programmable gate array (FPGA) installed in the circuit board. In addition, each of the object detector 18 and the controller 19 may be entirely or partially realized by the software function module in cooperation with the hardware.

Next, the first restraining unit 16 and the second restraining unit 17 will be described in detail.

The first restraining unit 16 and the second restraining unit 17 have configurations and functions which are the same as each other. Therefore, herein, the first restraining unit 16 will be described as a representative. In a case where the second restraining unit 17 is described, in the following description on the first restraining unit 16, the "first restraining unit 16" may be read as the "second restraining unit 17", the "first conveyor 14" may be read as the "second conveyor 15", the "upper surface 14a of the first conveyor 14" may be read as the "upper surface 15a of the second conveyor 15", the "the second conveyor 15" may be read as the "transport conveyor S2", the "the upper surface 15a of the second conveyor 15" may be read as the "upper surface S2a of the transport conveyor S2".

In a case of the first restraining unit 16, the first conveyor 14 is an example of a "conveyor". The second conveyor 15 is an example of an "object-transporting destination". A position of the upper surface 15a of the second conveyor 15 is an example of an "object-transporting destination position". On the other hand, in a case of the second restraining unit 17, the second conveyor 15 is an example of a "conveyor". The transport conveyor S2 is an example of an "object-transporting destination". A position of the upper surface S2a of the transport conveyor S2 is an example of an "object-transporting destination position". The transport conveyor S2 may be a part of the transporter 1.

Figure 2:
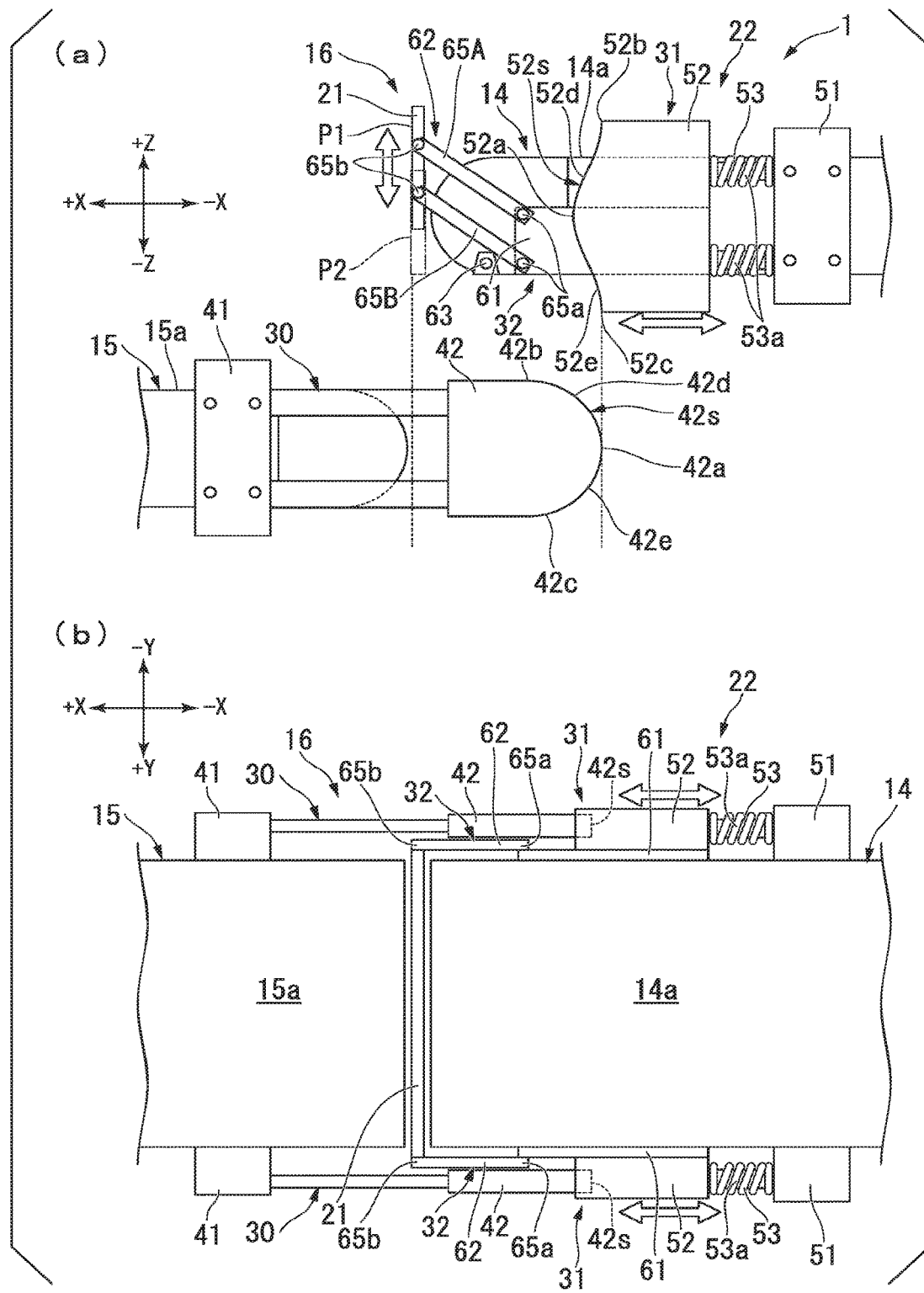
FIG. 2 is a partially enlarged view showing the transporter according to the first embodiment.

FIG. 2 is a partially enlarged view of the transporter 1.

(a) in FIG. 2 is a side view showing the periphery of the first restraining unit 16. (b) in FIG. 2 is a plan view showing the periphery of the first restraining unit 16.

As shown in FIG. 2, the first restraining unit 16 includes a restrainer 21 and a restrainer moving unit 22.

First, the restrainer 21 will be described.

The restrainer 21 is disposed corresponding to a downstream end of the first conveyor 14 in the +X-direction. The term of "disposed corresponding to an end of the conveyor" means that the restrainer 21 is disposed at a position facing the end of the conveyor. That is, in addition to a case where the restrainer is in contact with the end of the conveyor, the term of "disposed corresponding to an end of the conveyor" also includes a case where a gap is present between the restrainer and the end of the conveyor. According to the present embodiment, the restrainer 21 is disposed in the gap between the first conveyor 14 and the second conveyor 15 in the +X-direction, and moves up and down in the gap between the first conveyor 14 and the second conveyor 15. In this embodiment, the restrainer 21 is in the vicinity of the downstream end of the first conveyor 14. The restrainer 21 may be away from a position in the conveyor 14, at which the first conveyor 14 receives the object M from the holder 12.

More specifically, for example, the restrainer 21 is a plate member extending along the Z-direction. The restrainer 21 is movable between a restraining position (i.e., first position) P1 and a releasing position (i.e., second position) P2. For example, the restrainer 21 is a stopper for the object M.

At the restraining position P1, at least a part of the restrainer 21 protrudes upward from the upper surface (i.e., transport surface) 14a of the first conveyor 14. In this manner, the object M placed on the first conveyor 14 comes into contact with the restrainer 21, and thus, the object M cannot move forward to the downstream side of the restrainer 21. In this manner, the restrainer 21 located at the restraining position P1 restrains the movement of the object M moving from the first conveyor 14 toward the second conveyor 15, at a downstream end of the first conveyor 14. For example, even in a state where the first conveyor 14 is continuously rotated, the restrainer 21 according to the present embodiment restrains the movement of the object M in such a way that the object M transported by the first conveyor 14 comes into contact with the restrainer 21. In this manner, the restrainer 21 causes the object M placed on the first conveyor 14 to be stayed on the first conveyor 14. That is, the restrainer 21 restrains the object M from being further conveyed by the first conveyor 14.

On the other hand, at the releasing position P2, the restrainer 21 is lowered to below the upper surface (i.e., transport surface) 14a of the first conveyor 14. In this manner, the object M placed on the first conveyor 14 does not come into contact with the restrainer 21 and can move forward to the downstream side of the restrainer 21. In this manner, the restrainer 21 located at the releasing position P2 allows the movement of the object M moving from the first conveyor 14 toward the second conveyor 15. For example, when the first conveyor 14 is rotated, the object M placed on the first conveyor 14 is moved from the first conveyor 14 to the second conveyor 15.

However, the configuration of the restrainer 21 is not limited to the above-described example. As long as the restrainer 21 can restrain the movement of the object M on the conveyor, a shape or a position thereof (e.g., specific position such as the restraining position P1 and the releasing position P2), and a specific operation for restraining/releasing the movement of the object M are not limited to those which are particularly designated. For example, without being limited to the plate-shaped member, the restrainer 21 may be a member such as a fence or a bar. The restrainer 21 is not limited to a member moving in a vertical direction so as to move between the restraining position P1 and the releasing position P2. The restrainer 21 may be a member moving (e.g., rotating) in a horizontal direction or in other directions so as to move between the restraining position P1 and the releasing position P2. Without being limited to a position below the restraining position P1, the releasing position P2 may be above the restraining position P1 or a lateral position in the horizontal direction. Without being limited to a member extending over the entire width of the conveyor, the restrainer 21 may be disposed corresponding to a part of the entire width of the conveyor.

Next, the restrainer moving unit 22 will be described.

In a case where a position of the first conveyor 14 relative to the second conveyor 15 in the Z-direction is out of a preset range (i.e., predetermined range), the restrainer moving unit 22 keeps the restrainer 21 at the restraining position P1.

On the other hand, in a case where the position of the first conveyor 14 relative to the second conveyor 15 in the Z-direction comes into the preset range, the restrainer moving unit 22 starts to move the restrainer 21 toward the releasing position P2. Here, the term of "position of the first conveyor 14 relative to the second conveyor 15 in the Z-direction" means a position of the upper surface 14a of the first conveyor 14 relative to the upper surface 15a of the second conveyor 15 in the Z-direction, for example. Therefore, the position of the first conveyor 14 relative to the second conveyor 15 in the Z-direction may be referred to as a distance (i.e., relative distance) between the upper surface 15a of the second conveyor 15 and the upper surface 14a of the first conveyor 14 in the Z-direction, for example. The term of "preset range" described herein means a boundary where the restrainer 21 is changed between the restraining position P1 and the releasing position P2, and can be optionally set depending on the type of the object M or other circumstances.

As shown in FIG. 2, the restrainer moving unit 22 according to the present embodiment include a pair of fixed arms (e.g., operation arms) 30, a pair of movable arms (e.g., operation target arms) 31, and a pair of linkages 32 (i.e., physical linkage). The fixed arm 30 is provided on the second conveyor (i.e., object-transporting destination) 15. The fixed arm 30 is an example of a "first arm". On the other hand, the movable arm 31 and the linkage 32 are provided on the first conveyor 14. The movable arm 31 is an example of a "second arm".

First, the fixed arm 30 will be described.

The pair of fixed arms 30 are separately disposed on both sides of the second conveyor 15 in the +Y-direction and the −Y-direction. For example, each of the pair of fixed arms 30 includes a fixed arm base 41 and a fixed arm body 42.

The fixed arm base 41 is fixed to a side surface (e.g., frame portion) of the second conveyor 15.

The fixed arm body 42 is fixed to the fixed arm base 41, and is supported by the second conveyor 15 via the fixed arm base 41. The fixed arm body 42 protrudes from the fixed arm base 41 in the −X-direction. For example, the fixed arm body 42 protrudes in the −X-direction further than the upstream end of the second conveyor 15.

The fixed arm body 42 has a first contact surface 42s formed in a convex shape protruding in the −X-direction, for example. The first contact surface 42s has a center 42a in the Z-direction, an upper edge 42b, and a lower edge 42c. Then, the first contact surface 42s is formed in a convex shape in which the center 42a protrudes in the −X-direction with respect to the upper edge 42h and the lower edge 42c. For example, the first contact surface 42s has a first inclined surface 42d between the upper edge 42h and the center 42a. The first inclined surface 42d is inclined so as that a part of the first inclined surface 42d is gradually positioned farther forward in the −X-direction as the part of the first inclined surface 42d is farther away from the upper edge 42b toward the center 42a. Similarly, the first contact surface 42s has a second inclined surface 42c between the lower edge 42c and the center 42a. The second inclined surface 42e is inclined so as that a part of the second inclined surface 42e is gradually positioned farther forward in the −X-direction as the part of the second inclined surface 42e is farther away from the lower edge 42c toward the center 42a.

Next, the movable arm 31 will be described.

The pair of movable arms 31 are separately disposed on both sides of the first conveyor 14 in the +Y-direction and the −Y-direction. In a case where the position of the first conveyor 14 relative to the second conveyor 15 in the Z-direction comes into the preset range, the movable arm 31 comes into contact with the fixed arm 30, and is driven by the fixed arm 30. For example, the pair of movable arms 31 have a movable arm base 51, a movable arm body 52, and a passive deformable mechanism 53.

The movable arm base 51 is fixed to a side surface (e.g., frame portion) of the first conveyor 14.

The movable arm body 52 is connected to the movable arm base 51 via the passive deformable mechanism 53, and is supported by the first conveyor 14 via the passive deformable mechanism 53 and the movable arm base 51. The movable arm body 52 is an example of a "movable member". The movable arm body 52 protrudes in the +X-direction from the passive deformable mechanism 53.

The movable arm body 52 has a second contact surface 52s formed in a convex shape protruding in the +X-direction, for example. The second contact surface 52s has a center 52a in the Z-direction, an upper edge 52b, and a lower edge 52c. Then, the second contact surface 52s is formed in a convex shape in which the center 52a protrudes in the +X-direction with respect to the upper edge 52b and the lower edge 52c. For example, the second contact surface 52s has a first inclined surface 52d between the upper edge 52b and the center 52a. The first inclined surface 52d is inclined so as that a part of the first inclined surface 52d is gradually positioned forward in the +X-direction as the part of the first inclined surface 52d is further away from the upper edge 52b toward the center 52a. Similarly, the second contact surface 52s has a second inclined surface 52e between the lower edge 52c and the center 52a. The second inclined surface 52e is inclined so as that a part of the second inclined surface 52e is gradually positioned forward in the +X-direction as the part of the second inclined surface 52e is farther away from the lower edge 52c toward the center 52a.

At least a part of the center 52a of the second contact surface 52s is located on a side in the +X-direction, compared to at least a part of the center 42a of the first contact surface 42s. In other words, at least a part of the center 52a of the second contact surface 52s and at least a part of the center 42a of the first contact surface 42s overlap each other in the Z-direction. Therefore, in a case where the position of the first conveyor 14 relative to the second conveyor 15 in the Z-direction comes into the preset range, the second contact surface 52s comes into contact with the first contact surface 42s. A size of "preset range" can be optionally set by adjusting a shape of the first contact surface 42s and the second contact surface 52s.

According to the present embodiment, in a state where the first conveyor 14 is located lower than the second conveyor 15, the first inclined surface 52d of the second contact surface 52s faces the second inclined surface 42e of the first contact surface 42s in the Z-direction. In a case where the first conveyor 14 and the second conveyor 15 move close to each other in a state where the first conveyor 14 is located lower than the second conveyor 15, the first inclined surface 52d of the second contact surface 52s comes into contact with the second inclined surface 42e of the first contact surface 42s.

On the other hand, in a state where the first conveyor 14 is located higher than the second conveyor 15, the second inclined surface 52e of the second contact surface 52s faces the first inclined surface 42d of the first contact surface 42s in the Z-direction. In a case where the first conveyor 14 and the second conveyor 15 move close to each other in a state where the first conveyor 14 is located higher than the second conveyor 15, the second inclined surface 52e of the second contact surface 52s comes into contact with the first inclined surface 42d of the first contact surface 42s.

The first contact surface 42s and the second contact surface 52s has a position relationship in which the first contact surface 42s and the second contact surface 52s can start to come into contact with each other without large resistance (i.e., smoothly). In addition, the first contact surface 42s and the second contact surface 52s have a curved shape which can smoothly continue a contact state from when both of these start to come into contact with each other until the center 42a of the first contact surface 42s and the center 52a of the second contact surface 52s come into contact with each other.

The shape of the first contact surface 42s is substantially symmetrical (i.e., vertically symmetrical) to a center line extending along the +X-direction. Similarly, the shape of the second contact surface 52s is substantially symmetrical (i.e., vertically symmetrical) to the center line extending along the +X-direction. Therefore, the first contact surface 42s and the second contact surface 52s are brought into substantially the same contact state (i.e., contact behavior), in a case where the first conveyor 14 and the second conveyor 15 move close to each other in a state where the first conveyor 14 is located lower than the second conveyor 15, and in a case where the first conveyor 14 and the second conveyor 15 move close to each other in a state where the first conveyor 14 is located higher than the second conveyor 15. The term of contact state (i.e., contact behavior) described herein includes a pushing behavior (e.g., pushing speed or pushing amount) of the movable arm 31 pushed by the fixed arm 30 (to be described later).

The contact state (i.e., contact behavior) between the first contact surface 42s and the second contact surface 52s may be changed from that of the above-described example by changing a curved shape of the first contact surface 42s and the second contact surface 52s. For example, the pushing speed of the movable arm 31 pushed by the fixed arm 30 can become gentle by smoothing the curved shape of the first contact surface 42s and the second contact surface 52s. In addition, the push amount of the movable arm 31 pushed by the fixed arm 30 can be increased by increasing a variation width in the −X-direction (e.g., height difference in the −X-direction) between the center 42a and the edges 42b and 42c of the first contact surface 42s. Similarly, the push amount of the movable arm 31 pushed by the fixed arm 30 can be increased by increasing a variation width in the +X-direction (e.g., height difference in the +X-direction) between the center 52a and the edges 52b and 52c of the second contact surface 52s.

Shapes of the first contact surface 42s and the second contact surface 52s are not limited to the above-described example. For example, without being limited to the curved shape, each of the first inclined surface 42d, the second inclined surface 42e, the first inclined surface 52d, and the second inclined surface 52e may have a planar shape.

Next, the passive deformable mechanism 53 will be described.

The passive deformable mechanism 53 is disposed between the movable arm base 51 and the movable arm body 52. The passive deformable mechanism 53 includes a spring member 53a disposed between the movable arm base 51 and the movable arm body 52, and is elastically deformable between the movable arm base 51 and the movable arm body 52. In a case where the first contact surface 42s of the fixed arm 30 and the second contact surface 52s of the movable arm 31 are brought into contact with each other by the second conveyor 15 and the first conveyor 14 moving close to each other, the spring member 53a is compressed. In this manner, the passive deformable mechanism 53 allows the second contact surface 52s of the movable arm 31 to be retreated (i.e., to be moved in the −X-direction) with respect to the first contact surface 42s of the fixed arm 30. That is, the movable arm body 52 can be retreated by at least a part of the passive deformable mechanism 53 being deformed. On the other hand, in a case where the first contact surface 42s of the fixed arm 30 and the second contact surface 52s of the movable arm 31 are separated away from each other, the spring member 53a is stretched. In this manner, the passive deformable mechanism 53 allows the movable arm 31 to return to its original position.

Next, the linkage 32 will be described.

The linkage 32 links an act (e.g., movement) of the movable arm 31 and an act (e.g., movement) of the restrainer 21 with each other. For example, the linkage 32 links the movement of the movable arm body 52 of the movable arm 31 and the movement of the restrainer 21 with each other.

According to the present embodiment, the pair of linkages 32 connect the movable arm 31 and the restrainer 21 with each other in each of both sides of the first conveyor 14 in the +Y-direction and the −Y-direction. For example, each of the pair of linkages 32 includes a slide member 61, a link 62, and a link supporter 63.

The slide member 61 is fixed to the movable arm body 52, and is moved together with the movable arm body 52 while the relative position of the slide member 61 with respect to the movable arm body 52 is not changed. According to the present embodiment, the slide member 61 is fixed to the movable arm body 52 after being formed separately from the movable arm body 52. Alternatively, the slide member 61 may be formed integrally with the movable arm body 52. In other words, the slide member 61 may be a portion of the movable arm body 52.

The link 62 is disposed between the slide member 61 and the restrainer 21. The link 62 is pivotably connected to each of the slide member 61 and the restrainer 21 so that the restrainer 21 is moved from the restraining position P1 toward the releasing position P2 as the slide member 61 is moved in a direction away from the fixed arm 30.

For example, the link 62 according to the present embodiment includes two link members 65A and 65B. The two link members 65A and 65B are disposed parallel to each other. Each of the two link members 65A and 65B has a first end 65a pivotably coupled with the slide member 61, and a second end 65b pivotably coupled with the restrainer 21. In this manner, the two link members 65A and 65B form a parallel link mechanism which couples the slide member 61 and the restrainer 21 with each other.

The link supporters 63 are respectively disposed on both sides of the first conveyor 14 in the +Y-direction and the −Y-direction. For example, the link supporter 63 is disposed below the link 62, and is fixed to the side surface (e.g., frame portion) of the first conveyor 14. The link 62 (e.g., the link member 65B on the lower side) rides on the link supporter 63. In this manner, the link supporter 63 supports the link 62 (e.g., the link member 65B on the lower side) from below. The link supporter 63 supports the link 62 (e.g., the link member 65A and 65B) by adopting an oblique posture in which the second end 65b of the link 62 (e.g., the link member 65A and 65B) is located above the first end 65a.

Next, an operation of the restrainer moving unit 22 will be described.

First, the movement of the restrainer 21 from the restraining position P1 to the releasing position P2 will be described.

In a case where the first conveyor 14 and the second conveyor 15 move close to each other in the Z-direction, if the position of the first conveyor 14 relative to the second conveyor 15 in the Z-direction comes into the preset range, the first contact surface 42s of the fixed arm 30 and the second contact surface 52s of the movable arm 31 come into contact with each other.

In a state where the first contact surface 42s of the fixed arm 30 and the second contact surface 52s of the movable arm 31 are in contact with each other, if the first conveyor 14 and the second conveyor 15 move further closer to each other in the Z-direction, the fixed arm 30 pushes the movable arm body 52 of the movable arm 31 in the −X-direction. That is, the movable arm body 52 is moved in the −X-direction by a reaction force generated by the contact between the fixed arm 30 and the movable arm 31. In addition, as the first conveyor 14 and the second conveyor 15 move closer to each other in the Z-direction, the pushing amount of the movable arm 31 pushed by the fixed arm 30 gradually increases. For example, according to the present embodiment, in a state where the center 42a of the first conveyor 14 and the center 52a of the second conveyor 15 are in contact with each other, the pushing amount of the movable arm body 52 is maximized.

If the movable arm body 52 is moved in the −X-direction, the slide member 61 is moved together with the movable arm body 52 in the −X-direction. As a result, the first end 65a of the link 62 (e.g., link members 65A and 65B) coupled with the slide member 61 is moved in the −X-direction. In this manner, a distance is lengthened between the first end 65a of the link 62 (e.g., link members 65A and 65B) and the link supporter 63. As a result, the link 62 (e.g., link members 65A and 65B) pivots toward a substantially horizontal plane around the first end 65a as a pivot center. In this manner, the restrainer 21 is moved from the restraining position P1 toward the releasing position P2.

Then, if the movable arm body 52 is pushed a certain amount, that is, if the position of the first conveyor 14 relative to the second conveyor 15 in the Z-direction comes into a certain range, the restrainer 21 reaches the releasing position P2. For example, according to the present embodiment, when the upper surface 15a of the second conveyor 15 and the upper surface 14a of the first conveyor 14 are located at substantially the same position, or slightly before the upper surface 15a of the second conveyor 15 and the upper surface 14a of the first conveyor 14 are located at substantially the same position, the restrainer 21 reaches the releasing position P2. In this manner, the object M blocked in the downstream end of the first conveyor 14 by the restrainer 21 can flow to the second conveyor 15.

Next, returning of the restrainer 21 from the releasing position P2 to the restraining position P1 will be described.

In a case where the first conveyor 14 and the second conveyor 15 are separated from each other in the Z-direction, as the first conveyor 14 and the second conveyor 15 are further separated from each other in the Z-direction, the pushing amount of the movable arm body 52 pushed by the fixed arm 30 gradually decreases. In this manner, the movable arm body 52 is moved in the +X-direction by a restoring force (e.g., an elastic force of the spring member 53a) of the passive deformable mechanism 53.

If the movable arm body 52 is moved in the +X-direction, the slide member 61 is moved together with the movable arm body 52 in the +X-direction. As a result, the first end 65a of the link 62 (e.g., link members 65A and 65B) coupled with the slide member 61 is moved in the +X-direction. In this manner, a distance is shortened between the first end 65a of the link 62 (e.g., link members 65A and 65B) and the link supporter 63. As a result, the link 62 (e.g., link members 65A and 65B) pivots in a direction away from a substantially horizontal plane around the first end 65a as a pivot center. In this manner, the restrainer 21 moves from the releasing position P2 toward the restraining position P1.

Then, if the position of the first conveyor 14 relative to the second conveyor 15 in the Z-direction is beyond the preset range, the first contact surface 42s of the fixed arm 30 and the second contact surface 52s of the movable arm 31 are completely separated from each other, and the restrainer 21 returns to the restraining position P1. In this manner, in a case where the position of the first conveyor 14 relative to the second conveyor 15 in the Z-direction is out of the preset range, the movement of the object M is restrained, and the object M is suppressed from falling down.

However, the configuration of the restrainer moving unit 22 is not limited to the above-described example. As long as a configuration in which the restrainer 21 is moved is adopted in a case where a predetermined condition is satisfied, a shape or a position of the restrainer moving unit 22, and a specific act for moving the restrainer 21 are not limited to those which are particularly designated. For example, without having the fixed arm 30, the restrainer moving unit 22 may adopt a configuration in which the movable arm 31 comes into contact with a frame portion of the second conveyor 15 so as to move the restrainer 21. In addition, without having the movable arm 21, the restrainer moving unit 22 may adopt a configuration in which the fixed arm 30 or a frame portion of the second conveyor 15 comes into direct contact with the restrainer 21 or the link 62 (e.g., the link members 65A and 65B) so as to move the restrainer 21.

Next, overall operations of the transporter 1 will be described.

Figure 3:
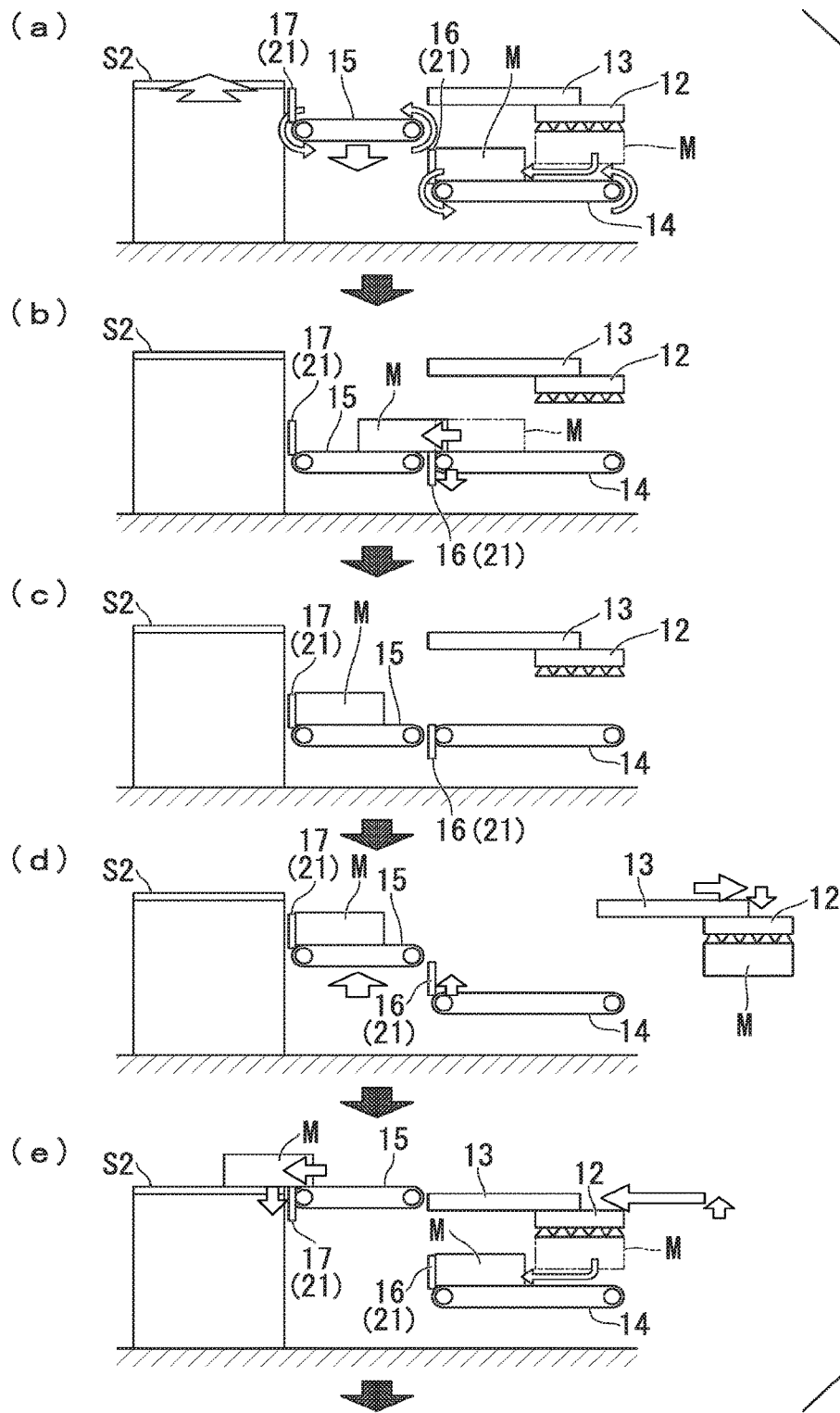
FIG. 3 is a side view showing an example of a transport operation flow of the transporter according to the first embodiment.

FIG. 3 is a side view showing an example of a transport operation flow of the transporter 1.

First, the controller 19 of the transporter 1 operates the holder moving unit 13 based on a detection result of the object detector 18, and moves the holder 12 toward the object M in the box pallet S1. Then, the controller 19 causes the holder 12 to hold the object M based on the detection result of the object detector 18. Then, the controller 19 operates the holder moving unit 13, and moves the holder 12 holding the object M. In this manner, the object M is moved to the first conveyor 14 by the holder 12.

Here, when the object M is moved to the first conveyor 14, in a case where the position of the first conveyor 14 relative to the second conveyor 15 in the Z-direction is out of the preset range, the object M is blocked by the first restraining unit 16. Then, while the object M is blocked by the first restraining unit 16, the second conveyor 15 is moved toward substantially the same height as that of the first conveyor 14 (refer to (a) in FIG. 3).

Next, if the second conveyor 15 reaches substantially the same height as that of the first conveyor 14, for example, the restrainer 21 of the first restraining unit 16 is moved to the releasing position P2, and the object M is moved from the first conveyor 14 to the second conveyor 15 (refer to (b) in FIG. 3). Then, the object M moved to the second conveyor 15 is blocked by the second restraining unit 17 (refer to (c) in FIG. 3).

If the object M is completely moved from the first conveyor 14 to the second conveyor 15, the second conveyor 15 starts to move toward substantially the same height as that of the transport conveyor S2. Then, if the heights of the second conveyor 15 and the first conveyor 14 are different from each other, the restrainer 21 of the first restraining unit 16 moves again to the restraining position P1, and a subsequent object M is brought into a blocked state (refer to (d) in FIG. 3). In addition, while the second conveyor 15 transports the object M, the first conveyor 14 and the holder moving unit 13 start to move to a position for holding (e.g., for catching) the object M serving as a subsequent transport target placed in the box pallet S1. For example, while the second conveyor 15 transports the object M, the holder moving unit 13 moves the holder 12 toward the object M serving as the subsequent transport target placed in the box pallet S1, and causes the holder 12 to hold the object M serving as the subsequent transport target. "The second conveyor 15 transports the object M" may include a case where the second conveyor 15 transports the object M in the Z direction by the second conveyor 15 being moved in the Z direction.

If the holder 12 completely holds the object M serving as the subsequent transport target, the controller 19 operates the holder moving unit 13 without waiting for the movement of the preceding object M from the second conveyor 15 to the transport conveyor S2, and moves the object M held by the holder 12 toward the first conveyor 14. In addition, if the second conveyor 15 reaches substantially the same height as that of the transport conveyor S2, the restrainer 21 of the second restraining unit 17 moves to the releasing position P2, and releases the object M blocked by the second restraining unit 17. In this manner, the object M moves from the second conveyor 15 to the transport conveyor S2 (refer to (e) in FIG. 3). If the object M is completely moved from the second conveyor 15 to the transport conveyor S2, the second conveyor 15 moves toward substantially the same height as that of the first conveyor 14 in order to receive the subsequent object M. At this time, if the heights of the second conveyor 15 and the transport conveyor S2 are different from each other, the restrainer 21 of the second restraining unit 17 moves to the restraining position P1, and blocks a subsequent object M.

In the above-described operations, an operation sequence has been described as an example in which the second conveyor 15 comes to receive the object M blocked by the first restraining unit 16. The operations of the transporter 1 are not limited to the above-described example. A configuration may be adopted in which the second conveyor 15 is moved toward the first conveyor 14, and in which substantially at the same time, the first conveyor 14 is moved toward the second conveyor 15 so as to deliver and receive the object M.

In a case where the first conveyor 14 interferes with the holder moving unit 13 or the holder 12 when the first conveyor 14 is moved, the controller 19 also causes the holder moving unit 13 to be moved similarly to the first conveyor 14. In this manner, it is possible to avoid interference between the first conveyor 14 and the holder moving unit 13 or the holder 12.

In addition, in a case where it is estimated that holding the object M serving as the subsequent transport target takes more time than the movement of the object M from the first conveyor 14 to the second conveyor 15, while the object M is placed on the first conveyor 14, the controller 19 may move the holder moving unit 13 and the first conveyor 14 toward the object M serving as the subsequent transport target. That is, an operation for holding the object M serving as the subsequent transport target may be performed in advance, and the second conveyor 15 may be moved to a position of the first conveyor 14 while the first conveyor 14 is in the middle of operation or awaiting in order to receive the subsequent object M. In this manner, the preceding object M may be moved from the first conveyor 14 to the second conveyor 15.

Hitherto, a case has been described where the transporter 1 has two conveyors 14 and 15. Without having the second conveyor 15 the transporter 1 may have only one conveyor 14 and the restraining unit 16. In addition, the transporter 1 may have three or more conveyors and three or more restraining units. In this case, operations the same as those described above are repeatedly performed as many as the number of conveyors. In this manner, the object M can be moved to the desired object-transporting destination S2. In addition, while the second and subsequent conveyor transport the object M, the holder 12 and the holder moving unit 13 perform an unloading operation of the object M which is a new transport target.

According to this configuration, it is possible to achieve improved transport efficiency.

Here, depending on a type of objects handled by private logistics companies, the objects have unspecified and unfixed sizes. Accordingly, the objects are less likely to be arranged in order, and are complicatedly loaded. In order to realize automated unloading (e.g., depalletizing) of these objects, it is necessary to unload the objects while the objects which are easy to handle are discriminated on a timely basis. In addition, if the objects are transported to a transport destination (e.g., object-transporting destination S2) directly, transport efficiency is poor. Consequently, a conveyor (e.g., intermediate conveyor) disposed in the middle of a transport route may be used. Then, the objects are caused to temporarily stay on the conveyor in accordance with a height position of the conveyor relative to an object-transporting destination. In this manner, it is possible to shorten the total processing time (e.g., the speed for the unloading process can be increased).

Therefore, the transporter 1 according to the present embodiment includes the conveyor 14, the restrainer 21, and the restrainer moving unit 22. The conveyor 14 transports the object M in the +X-direction, and is movable in the Z-direction that is different from the +X-direction. The restrainer 21 is disposed corresponding to the downstream end of the conveyor 14 in the +X-direction. The restrainer moving unit 22 keeps, in a case where the position of the conveyor 14 relative to the object-transporting destination (e.g., the second conveyor 15) in the Z-direction is out of the preset range, the restrainer 21 at the restraining position P1 for restraining the movement of the object M. The restrainer moving unit 22 starts to move, in a case where the position of the conveyor 14 relative to the object-transporting destination in the Z-direction is in the preset range, the restrainer 21 toward the releasing position P2 for allowing the movement of the object M.

According to this configuration, in a case where the heights of the first conveyor 14 and the second conveyor 15 are greatly different from each other, the object M can be caused to stay on the first conveyor 14. On the other hand, in a case where the first conveyor 14 and the second conveyor 15 move close to each other, the object M can be smoothly moved from the first conveyor 14 toward the second conveyor 15. In this manner, it is possible to achieve improved transport efficiency.

Here, in a case where the rotation of the conveyor is stopped every time in order to cause the object to stay on the conveyor, controlling the rotation of the belt becomes complicated. In addition, time is wasted in accelerating or decelerating the belt speed of the conveyor, thereby degrading operation efficiency of the transporter. In addition, in a case where a plurality of objects are placed on the conveyor at a time, the operation of the conveyor is turned on/off in accordance with the first leading object. In this case, since other objects are stopped in the middle of the conveyor, the transport efficiency becomes poor.

On the other hand, the restrainer 21 according to the present embodiment can restrain the movement of the object M on the conveyor 14 in a state where the conveyor 14 is continuously rotated. In this manner, the conveyor 14 can be continuously rotated at all times. In this manner, it is no longer necessary to complicatedly control the rotation of the conveyor 14. In addition, it is possible to limit the amount of time needed for accelerating and decelerating the speed of the conveyor 14. Furthermore, even in a case where the plurality of objects are placed on the conveyor 14 at a time, it is no longer necessary to turn on/off the operation of the conveyor 14 in accordance with the first leading object. That is, all of the objects M can be continuously moved to the downstream end of the conveyor 14. In this manner, it is possible to improve transport efficiency.

According to the present embodiment, the restrainer moving unit 22 includes the fixed arm 30, the movable arm 31, and the linkage 32. The fixed arm 30 is on the second conveyor 15 (i.e., object-transporting destination of the first conveyor 14). In a case where the position of the first conveyor 14 relative to the second conveyor 15 in the Z-direction comes into the preset range, the movable arm 31 comes into contact with the fixed arm 30 so as to be driven by the fixed arm 30. The linkage 32 links the act of the movable arm 31 to the act of the restrainer 21.

According to this configuration, in a case where the position of the first conveyor 14 relative to the second conveyor 15 in the Z-direction comes into the preset range, the fixed arm 30 and the movable arm 31 come into contact with each other, thereby causing the restrainer 21 to move automatically. Therefore, a sensor for detecting the object M on the first conveyor 14 or an actuator for driving the restrainer 21 can be omitted. In this manner, in some cases, it is possible to reduce the cost of the transporter 1. In addition, according to the configuration of the present embodiment, compared to a case where the above-described sensor or actuator is provided, it is possible to realize simplified control for the transporter 1.

Here, if the object M is moved using one intermediate conveyor, the intermediate conveyor or the object M on the intermediate conveyor may interfere with the holder moving unit 13 or the holder 12. Therefore, while the object M on the intermediate conveyor is delivered to the object-transporting destination S2, the holder moving unit 13 and the holder 12 need to be retreated into a retreat place. During this retreat operation, an operation for holding the object M serving as the subsequent transport target cannot be performed. Consequently, unnecessary time is made in the unloading process operation.

On the other hand, according to the present embodiment, the transporter 1 includes the first conveyor 14 and the second conveyor 15 which are movable in the Z-direction independently of each other. According to this configuration, immediately after the object M is unloaded to the first conveyor 14, it is possible to start an operation for holding (e.g., catching) the object M serving as a subsequent transport target. Therefore, it is possible to improve work efficiency in the overall device.

Next, some modification examples of the present embodiment will be described. In each modification example, configurations other than those described below are substantially the same as the configurations according to the above-described embodiment. In addition, the modification examples are applicable to a transporter according to the second and third embodiments.

First Modification Example

Figure 4:
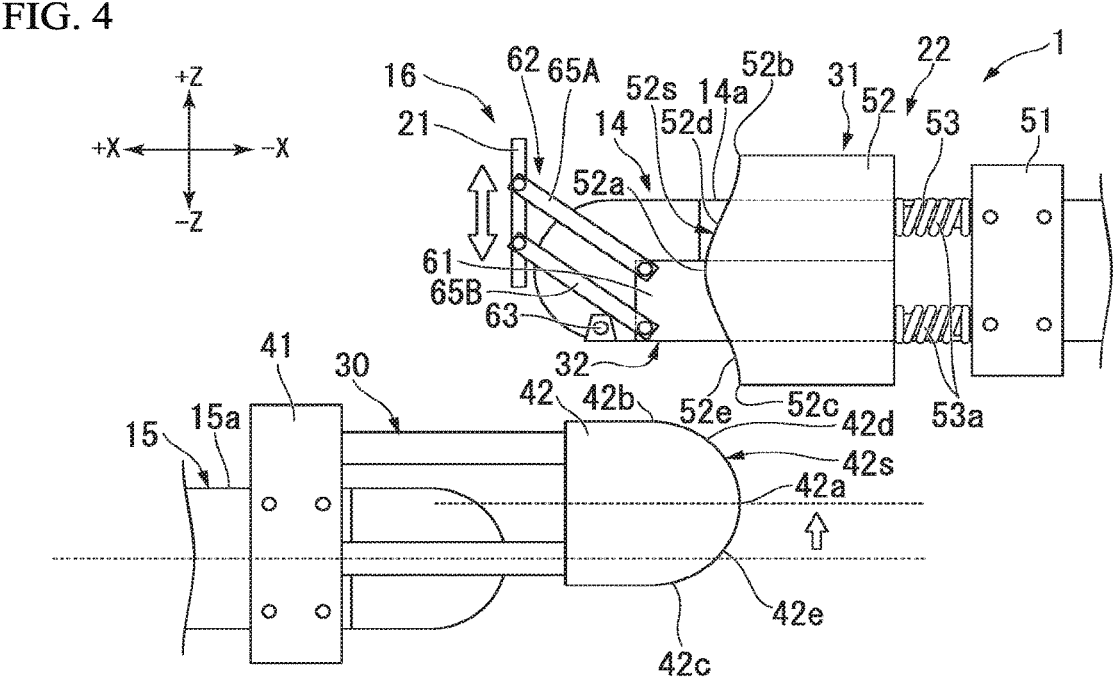
FIG. 4 is a partially enlarged side view showing a transporter according to a first modification example of the first embodiment.

FIG. 4 is a partially enlarged side view showing the transporter 1 according to a first modification example.

As shown in FIG. 4, according to the present modification example, the center (e.g., the center 42a) of the fixed arm 30 in the Z-direction is disposed at a position shifted in the +Z-direction, with respect to the center of the second conveyor 15 in the Z-direction. In this manner, in a case where the first conveyor 14 moves close to the second conveyor 15 from above, and in a case where the first conveyor 14 moves close to the second conveyor 15 from below, timing at which the restrainer 21 moves from the restraining position P1 toward the releasing position P2 is changed.

According to the present modification example, if the upper surface 15a of the second conveyor 15 is located higher than the upper surface 14a of the first conveyor 14, the restrainer moving unit 22 starts to move the restrainer 21 from the restraining position P1 toward the releasing position P2 when a distance in the Z-direction between the upper surface 15a of the second conveyor 15 and the upper surface 14a of the first conveyor 14 becomes shorter than a first distance (i.e., a first reference distance). On the other hand, if the upper surface 15a of the second conveyor 15 is located lower than the upper surface 14a of the first conveyor 14, the restrainer moving unit 22 starts to move the restrainer 21 from the restraining position P1 toward the releasing position P2 when the distance in the Z-direction between the upper surface 15a of the second conveyor 15 and the upper surface 14a of the first conveyor 14 becomes shorter than a second distance (i.e., a second reference distance) that is longer than the first distance.

For example, in a case where the first conveyor 14 and the second conveyor 15 move close to each other in a state where the first conveyor 14 is located higher than the second conveyor 15, the restrainer moving unit 22 moves the restrainer 21 to the releasing position P2 in a state where a step difference is present between the upper surface 14a of the first conveyor 14 and the upper surface 15a of the second conveyor 15. In this manner, in a state where the step difference remains between the upper surface 14a of the first conveyor 14 and the upper surface 15a of the second conveyor 15 the object M is movable from the first conveyor 14 to the second conveyor 15. In this manner, it is possible to achieve further improved transport efficiency.

In the example shown in FIG. 4, both the upper edge 42b and the lower edge 42c of the fixed arm 30 are shifted in the +Z-direction, compared to the upper edge 42b and the lower edge 42c of the fixed arm 30 according to the first embodiment. Alternatively, the upper edge 42b of the fixed arm 30 may be shifted in the +Z-direction, compared to the upper edge 42b of the fixed arm 30 according to the first embodiment, and the lower edge 42c of the fixed arm 30 may be located at substantially the same position as that of the lower edge 42c of the fixed arm 30 according to the first embodiment. According to this configuration, in a case where the first conveyor 14 is located higher than the second conveyor 15, in a state where the step difference remains between the upper surface 14a of the first conveyor 14 and the upper surface 15a of the second conveyor 15, the object M is also movable from the first conveyor 14 to the second conveyor 15.

Second Modification Example

The present modification example realizes the same operation effect as that of the above-described first modification example.

Figure 5:
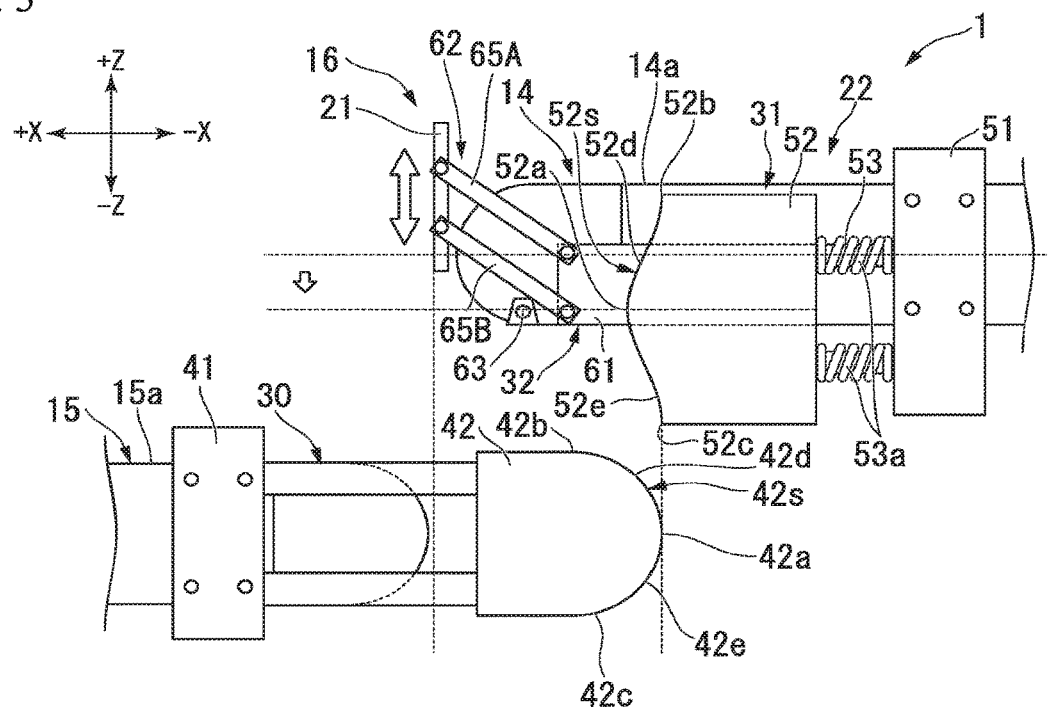
FIG. 5 is a partially enlarged side view showing a transporter according to a second modification example of the first embodiment.

FIG. 5 is a partially enlarged side view showing the transporter 1 according to a second modification example.

As shown in FIG. 5, according to the present modification example, the center (e.g., the center 52a) of the movable arm 31 in the Z-direction is disposed at a position shifted in the −Z-direction, with respect to the center of the first conveyor 14 in the Z-direction. In this manner, in a case where the first conveyor 14 moves close to the second conveyor 15 from above, and in a case where the first conveyor 14 moves close to the second conveyor 15 from below, timing at which the restrainer 21 moves from the restraining position P1 toward the releasing position P2 is changed. In this manner, the restrainer moving unit 22 according to the present modification example can realize the same operation effect as that of the restrainer moving unit 22 according to the first modification example.

In the example shown in FIG. 5, both the upper edge 52b and the lower edge 52c of the movable arm 31 are shifted in the −Z-direction, compared to the upper edge 52b and the lower edge 52c of the movable arm 31 according to the first embodiment. Alternatively, the lower edge 52c of the movable arm 31 may be shifted in the −Z-direction, compared to the lower edge 52c of the movable arm 31 according to the first embodiment, and the upper edge 52b of the movable arm 31 may be located at substantially the same position as that of the upper edge 52b of the movable arm 31 according to the first embodiment.

Third Modification Example

Figure 6:
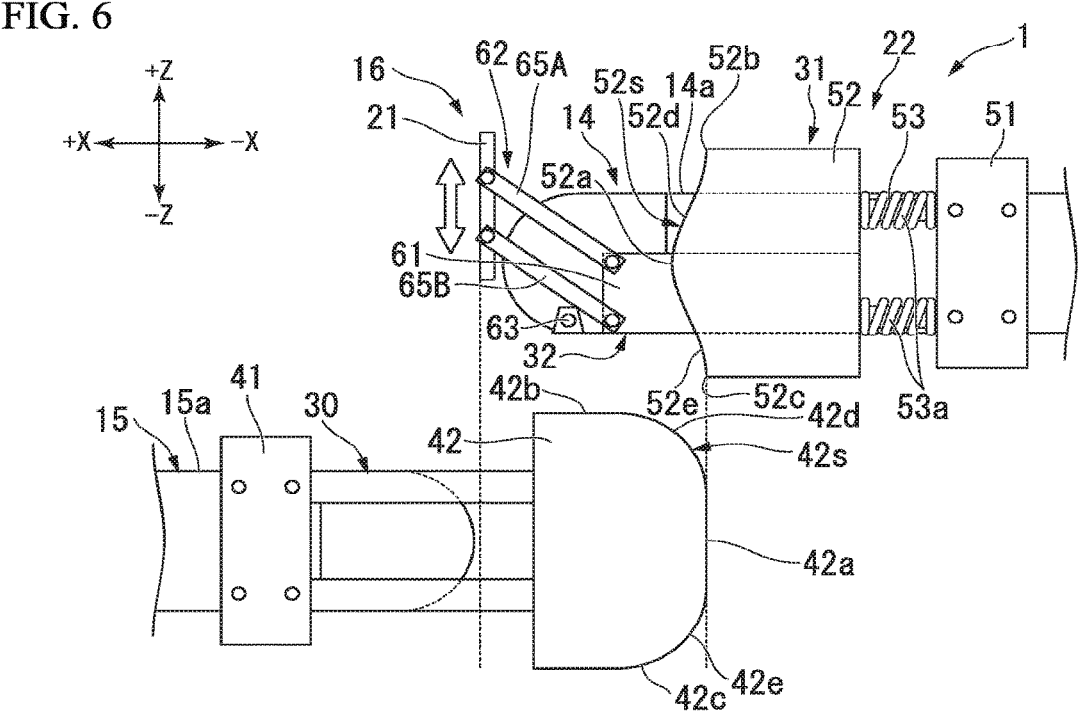
FIG. 6 is a partially enlarged side view showing a transporter according to a third modification example of the first embodiment.

FIG. 6 is a partially enlarged side view showing the transporter 1 according to a third modification example.

As shown in FIG. 6, according to the present modification example, the width (e.g., distance between the upper edge 42b and the lower edge 42c) of the fixed arm 30 in the Z-direction is wider than the width of the fixed arm 30 in the Z-direction according to the first embodiment. In this manner, it is possible to lengthen the period during which the restrainer 21 moves to the releasing position P2. In this manner, compared to the first embodiment, even in a state where a step difference remains to a certain degree between the upper surface 14a of the first conveyor 14 and the upper surface 15a of the second conveyor 15, the object M is movable from the first conveyor 14 to the second conveyor 15. In this manner, it is possible to achieve further improved transport efficiency.

Fourth Modification Example

The present modification example realizes the same operation effect as that of the above-described third modification example.

Figure 7:
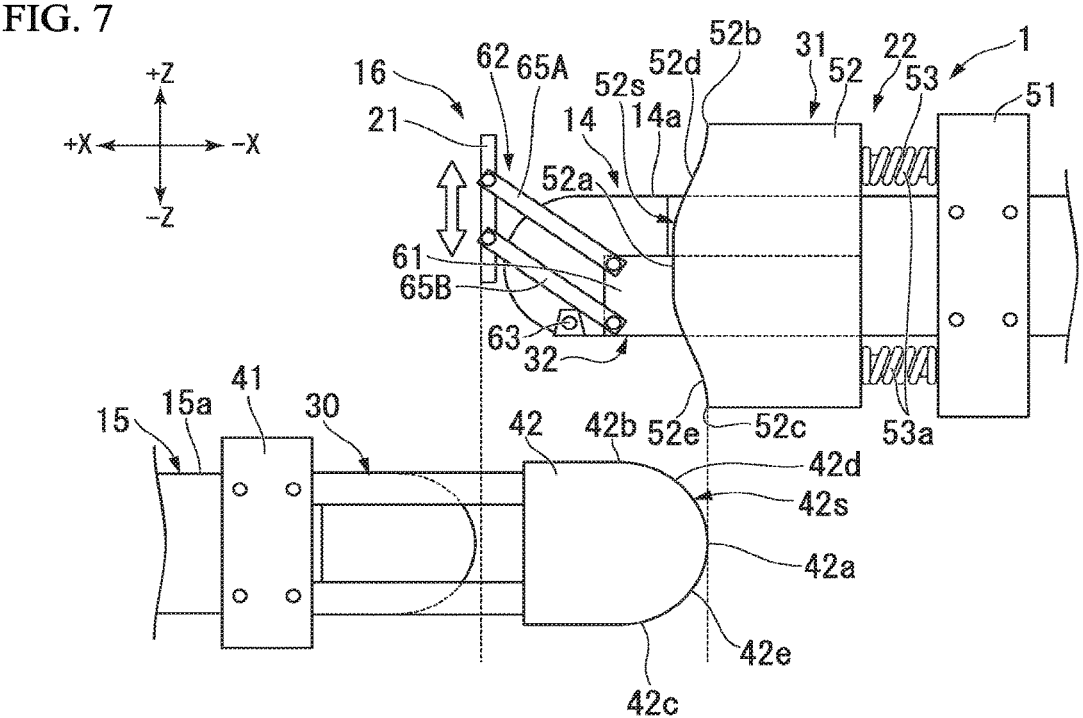
FIG. 7 is a partially enlarged side view showing a transporter according to a fourth modification example of the first embodiment.

FIG. 7 is a partially enlarged side view showing the transporter 1 according to a fourth modification example.

As shown in FIG. 7, according to the present modification example, a width (e.g., distance between the upper edge 52b and the lower edge 52c) of the movable arm 31 in the Z-direction is wider than the width of the movable arm 31 in the Z-direction according to the first embodiment. In this manner, it is possible to lengthen a period during which the restrainer 21 moves to the releasing position P2. In this manner, the restrainer moving unit 22 according to the present modification example can realize the same operation effect as that of the restrainer moving unit 22 according to the above-described third modification example.

Second Embodiment

Next, a second embodiment will be described. The present embodiment is different from the first embodiment in that the restrainer moving unit 22 includes a slide member 71 having a wedge-shaped portion, instead of the link 62. Configurations other than those described below are the same as the configurations according to the first embodiment.

Figure 8:
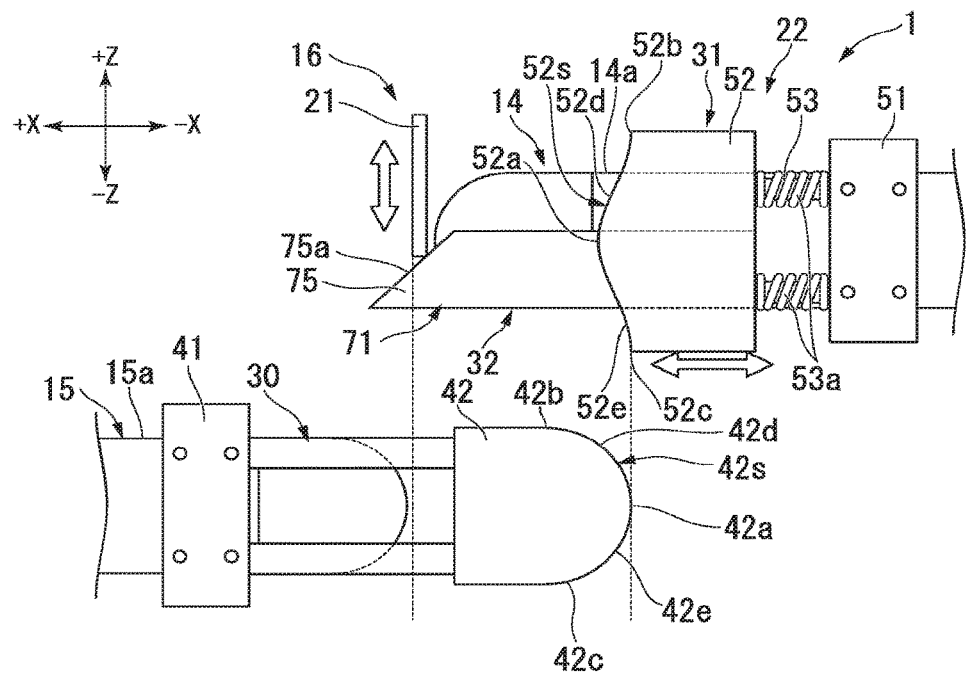
FIG. 8 is a partially enlarged side view showing a transporter according to a second embodiment.

FIG. 8 is a partially enlarged side view showing the transporter 1 according to the second embodiment.

As shown in FIG. 8, the restrainer moving unit 22 according to the present embodiment includes the fixed arm 30, the movable arm 31, and the linkage 32. The linkage 32 includes the slide member 71.

The slide member 71 is fixed to the movable arm body 52, and is moved together with the movable arm body 52. According to the present embodiment, the slide member 71 is fixed to the movable arm body 52 after being formed separately from the movable arm body 52. Alternatively, the slide member 71 may be formed integrally with the movable arm body 52. In other words, the slide member 71 may be a portion of the movable arm body 52.

The slide member 71 according to the present embodiment includes a slope portion 75 having a wedge shape. An upper surface 75a (i.e., slope surface) of the slope portion 75 is decline with respect to a horizontal plane, and gradually decreases as the slope portion 75 advances in the +X-direction. That is, the upper surface 75a has a declining direction that is substantially parallel to a direction from the movable arm 31 to the fixed arm 30 in a state where the fixed arm 30 and the movable arm 31 are in contact with each other. The slope portion 75 is disposed under the restrainer 21. The upper surface 75a of the slope portion 75 is in contact with a lower end of the restrainer 21 from below. In other words, the restrainer 21 rides on the upper surface 75a of the slope portion 75, and is supported from below by the upper surface 75a of the slope portion 75. The restrainer 21 may ride on the upper surface 75a of the slope portion 75 by its own weight of the restrainer 21, or may be pushed toward the upper surface 75a of the slope portion 75 by an elastic member such as a spring.

Next, an operation effect of the restrainer moving unit 22 according to the present embodiment will be described.

If the first conveyor 14 and the second conveyor 15 move close to each other in the Z-direction and the movable arm body 52 is moved in the −X-direction, the slide member 71 is moved together with the movable arm body 52 in the −X-direction. As a result, the slope portion 75 of the slide member 71 is moved in the −X-direction. In this manner, a supporting height of the slope portion 75 for supporting the restrainer 21 decreases. In this manner, the restrainer 21 moves from the restraining position P1 toward the releasing position P2.

On the other hand, if the first conveyor 14 and the second conveyor 15 are separated from each other in the Z-direction and the movable arm body 52 is moved in the +X-direction, the slide member 71 is moved together with the movable arm body 52 in the +X-direction. As a result, the slope portion 75 of the slide member 71 is moved in the +X-direction. In this manner, the supporting height of the slope portion 75 for supporting the restrainer 21 increases. In this manner, the restrainer 21 moves from the releasing position P2 toward the restraining position P1.

According to this configuration, similarly to the first embodiment, it is possible to achieve improved transport efficiency.

Third Embodiment

Next, a third embodiment will be described. The present embodiment is different from the first embodiment in that the restrainer moving unit 22 includes a rotary mechanism 81 instead of the link 62. Configurations other than those described below are the same as the configurations according to the first embodiment.

According to present embodiment, the fixed arm 30, the movable arm 31, and the linkage 32 are provided.

The movable arm 31 includes the rotary mechanism 81, a movable arm body 82, and a restoring force generating mechanism 83.

The rotary mechanism 81 is disposed on a side surface (e.g., frame portion) of the first conveyor 14. The rotary mechanism 81 supports the movable arm body 82 so as to be pivotable.

The movable arm body 82 is supported by the first conveyor 14 via the rotary mechanism 81. The movable arm body 82 is an example of a "movable member". The movable arm body 82 protrudes from the rotary mechanism 81 in the +X-direction. The movable arm body 82 is pivotable around the center line of the rotary mechanism 81 which extends along the +Y-direction, as a pivot center.

A tip end of the movable arm body 82 is located on a side in the +X-direction from a tip end of the fixed arm 30. In other words, at least a part of the movable arm body 82 and at least a part of the fixed arm 30 overlap each other in the Z-direction. Therefore, in a case where the position of the first conveyor 14 relative to the second conveyor 15 in the Z-direction comes into the preset range, the movable arm 31 comes into contact with the fixed arm 30, thereby being driven and rotated by the fixed arm 30. For example, in a case where the fixed arm 30 comes into contact with the movable arm 31 from below, the movable arm 31 (e.g., the movable arm body 82) is rotated in a first rotation direction (e.g., clockwise in FIG. 9). On the other hand, in a case where the fixed arm 30 comes into contact with the movable arm 31 from above, the movable arm 31 (e.g., the movable arm body 82) is rotated in a second rotation direction (e.g., counterclockwise in FIG. 9).

The restoring force generating mechanism 83 is disposed between the frame portion of the first conveyor 14 and the movable arm body 82. The restoring force generating mechanism 83 includes a spring member 83a and a damper member 83b. The spring member 83a and the damper member 83b are disposed between the frame portion of the first conveyor 14 and the movable arm body 82. In a case where the movable arm body 82 is rotated, the restoring force generating mechanism 83 generates a restoring force by the spring member 83a being compressed. The damper member 83b allows the spring member 83a to gently perform a returning operation of the movable arm body 82.

Next, the linkage 32 according to the present embodiment will be described.

The linkage 32 according to the present embodiment includes a conversion mechanism 91 and a slide member 92.

The conversion mechanism 91 converts the rotation of the movable arm body 82 into a linear movement of the slide member 92. For example, the conversion mechanism 91 is a rack and pinion mechanism, and includes a rack provided on the slide member 92 and a pinion gear provided on the movable arm body 82. For example, in a case where the movable arm body 82 is rotated clockwise in FIG. 9, the conversion mechanism 91 moves the slide member 92 in the +X-direction. On the other hand, in a case where the movable arm 31 is rotated counterclockwise in FIG. 9, the conversion mechanism 91 moves the slide member 92 in the −X-direction.

The slide member 92 according to the present embodiment includes a first slope portion 95 and a second slope portion 96 each of which has a wedge shape. The first slope portion 95 and the second slope portion 96 are separately disposed in the +X-direction and the −X-direction with respect to a reference position of the restrainer 21, and are disposed so as to be substantially symmetrical with respect to the reference position of the restrainer 21. The first slope portion 95 is disposed on a side in the −X-direction with respect to the reference position of the restrainer 21. The second slope portion 96 is disposed on a side in the +X-direction with respect to the reference position of the restrainer 21.

An upper surface 95a (i.e., slope surface) of the first slope portion 95 is declined with respect to a horizontal plane so as to become lower as the upper surface 95a advances in the −X-direction. That is, the upper surface 95a has a declining direction that is substantially parallel to a direction from the fixed arm 30 to the movable arm 31 in a state where the fixed arm 30 and the movable arm 31 are in contact with each other. On the other hand, an upper surface 96a (i.e., slope surface) of the second slope portion 96 is declined with respect to the horizontal plane so as to become lower as the upper surface 96a advances in the +X-direction. That is, the upper surface 96a has a declining direction that is substantially parallel to a direction from the movable arm 31 to the fixed arm 30 in a state where the fixed arm 30 and the movable arm 31 are in contact with each other. In a case where the slide member 92 is moved from the reference position in the +X-direction, the first slope portion 95 is under the restrainer 21, and the upper surface 95a of the first slope portion 95 comes into contact with a lower end of the restrainer 21 from below. In other words, the restrainer 21 rides on the upper surface 95a of the first slope portion 95, and is supported by the upper surface 95a of the first slope portion 95 from below. On the other hand, in a case where the slide member 92 is moved from the reference position in the −X-direction, the second slope portion 96 is under the restrainer 21, and the upper surface 96a of the second slope portion 96 comes into contact with the lower end of the restrainer 21 from below. In other words, the restrainer 21 rides on the upper surface 96a of the second slope portion 96, and is supported by the upper surface 96a of the second slope portion 96 from below. The restrainer 21 may ride on the upper surfaces 95a and 96a of the slope portions 95 and 96 by its own weight of the restrainer 21, or may be pushed toward the upper surfaces 95a and 96a of the slope portions 95 and 96 by an elastic member such as a spring.

Next, an operation effect of the restrainer moving unit 22 according to the present embodiment will be described.

Figure 9:
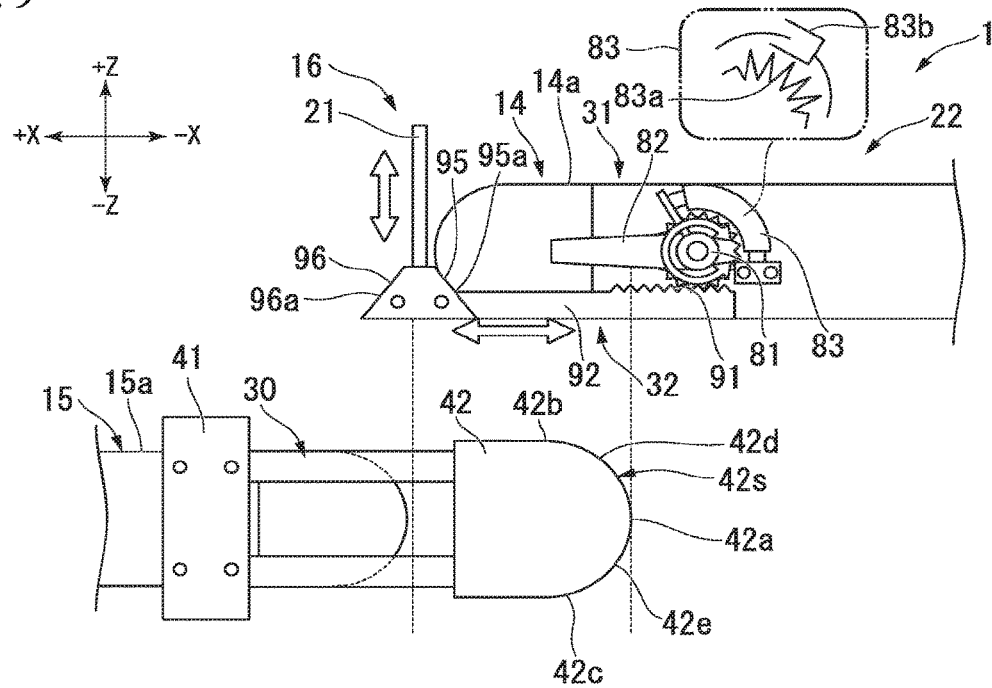
FIG. 9 is a partially enlarged side view showing a transporter according to a third embodiment.

If the first conveyor 14 is moved close to the second conveyor 15 from above and the movable arm 31 is rotated clockwise in FIG. 9, the slide member 92 is moved in the +X-direction. As a result, the first slope portion 95 of the slide member 92 is moved in the +X-direction. In this manner, a supporting height of the first slope portion 95 for supporting the restrainer 21 decreases. In this manner, the restrainer 21 is moved from the restraining position P1 toward the releasing position P2.

In addition, if the first conveyor 14 is moved close to the second conveyor 15 from below and the movable arm 31 is rotated counterclockwise in FIG. 9, the slide member 92 is moved in the −X-direction. As a result, the second slope portion 96 of the slide member 92 is moved in the −X-direction. In this manner, a supporting height of the second slope portion 96 for supporting the restrainer 21 decreases. In this manner, the restrainer 21 moves from the restraining position P1 toward the releasing position P2.

On the other hand, if the first conveyor 14 and the second conveyor 15 are separated from each other in the Z-direction, the movable arm body 82 returns to the reference position by the restoring force of the restoring force generating mechanism 83. In this manner, the slide member 92 also returns to the reference position. In this manner, the restrainer 21 moves from the releasing position P2 toward the restraining position P1.

According to this configuration, similarly to the first embodiment, it is possible to achieve improved transport efficiency. In addition, in the rotary mechanism 81 according to the present embodiment, in a case where the movable arm 31 is rotated clockwise and in a case where the movable arm 31 is rotated counterclockwise, a moving direction of the slide member 92 is reversed. Then, the first slope portion 95 and the second slope portion 96 are symmetrically formed. Even if the movable arm 31 is rotated in any direction, the restrainer 21 is vertically operated. In addition, the movable arm 31 is caused to be returned to the reference position by the restoring force generating mechanism 83. Therefore, when restrainer 21 is moved from the releasing position P2 toward the restraining position P1 the fixed arm 30 can be returned in a direction opposite to a direction in which the fixed arm 30 gets close to the movable arm 31, or can continue to be moved in the direction in which the fixed arm 30 gets close to the movable arm 31 and pass to the reverse side. Therefore, each of the first conveyor 14 and the second conveyor 15 can be operated freely and vertically.

Fourth Embodiment

Next, a fourth embodiment will be described. The present embodiment is different from the first embodiment in that the restrainer moving unit 22 includes a sensor 101 and an actuator 102 instead of the fixed arm 30 and the movable arm 31. Configurations other than those described below are the same as the configurations according to the first embodiment.

Figure 10:
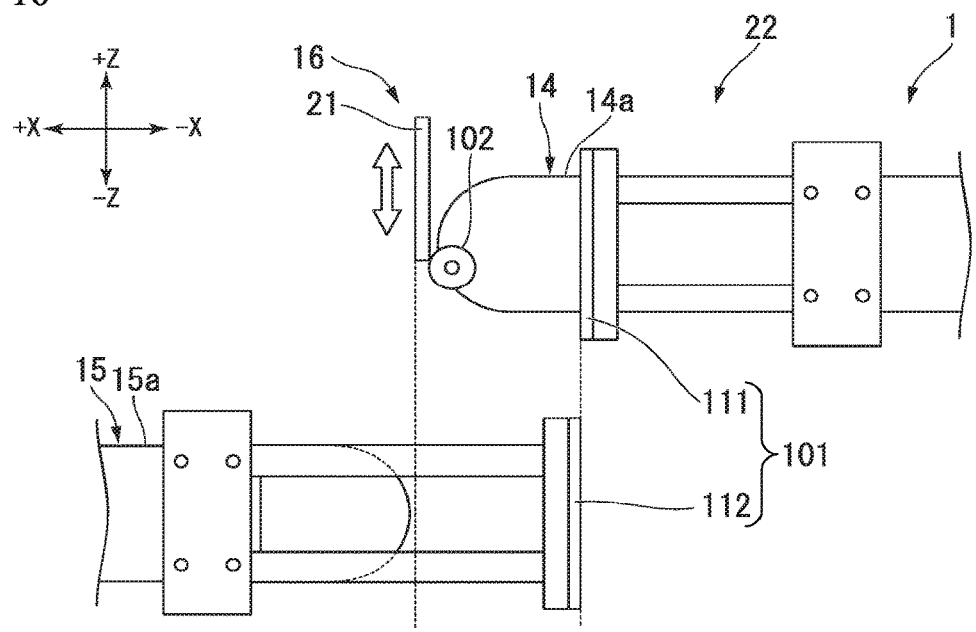
FIG. 10 is a partially enlarged side view showing a transporter according to a fourth embodiment.

FIG. 10 is a partially enlarged side view showing the transporter 1 according to the fourth embodiment.

As shown in FIG. 10, the restrainer moving unit 22 according to the present embodiment includes the sensor 101 and the actuator 102. The sensor 101 detects that the position of the first conveyor 14 relative to the second conveyor 15 in the Z-direction is in the preset range. The actuator 102 drives the restrainer 21 based on the detection result of the sensor.

For example, the sensor 101 is a non-contact sensor. For example, the sensor 101 includes a first proximity sensor component 111 and a second proximity sensor component 112. Any one of the first proximity sensor component 111 and the second proximity sensor component 112 is a radio wave transmitting component, and the other is a radio wave receiving component. The first proximity sensor component 111 is provided on the first conveyor 14, and is moved together with the first conveyor 14 in the Z-direction. On the other hand, the second proximity sensor component 112 is provided on the second conveyor 15, and is moved together with the second conveyor 15 in the Z-direction. Then, in a case where the position of the first conveyor 14 relative to the second conveyor 15 in the Z-direction comes into the preset range, at least a part of the first proximity sensor component 111 and at least a part of the second proximity sensor component 112 face each other. In this manner, the sensor 101 detects whether the position of the first conveyor 14 relative to the second conveyor 15 in the Z-direction is in the preset range.

A type of the sensor 101 is not limited to the above-described example. For example, the sensor 101 may be a sensor using on/off signals of light information such as a photo sensor, or may be a sensor using analog signals such as a position sensitive detector (PSD).

For example, the actuator 102 is a motor or a pneumatic cylinder, but is not limited thereto. In a case where the sensor 101 detects that the position of the first conveyor 14 relative to the second conveyor 15 in the Z-direction comes into the preset range, the actuator 102 start to move the restrainer 21 from the restraining position P1 toward the releasing position P2. On the other hand, in a case where the sensor 101 detects that the position of the first conveyor 14 relative to the second conveyor 15 in the Z-direction beyond a certain range, the actuator 102 moves the restrainer 21 from the releasing position P2 toward the restraining position P1.

According to this configuration, similarly to the first embodiment, it is also possible to achieve improved transport efficiency.

Next, some modification examples according to the present embodiment will be described. In each modification example, configurations other than those described below are substantially the same as the configurations according to the above-described fourth embodiment.

First Modification Example

Figure 11:
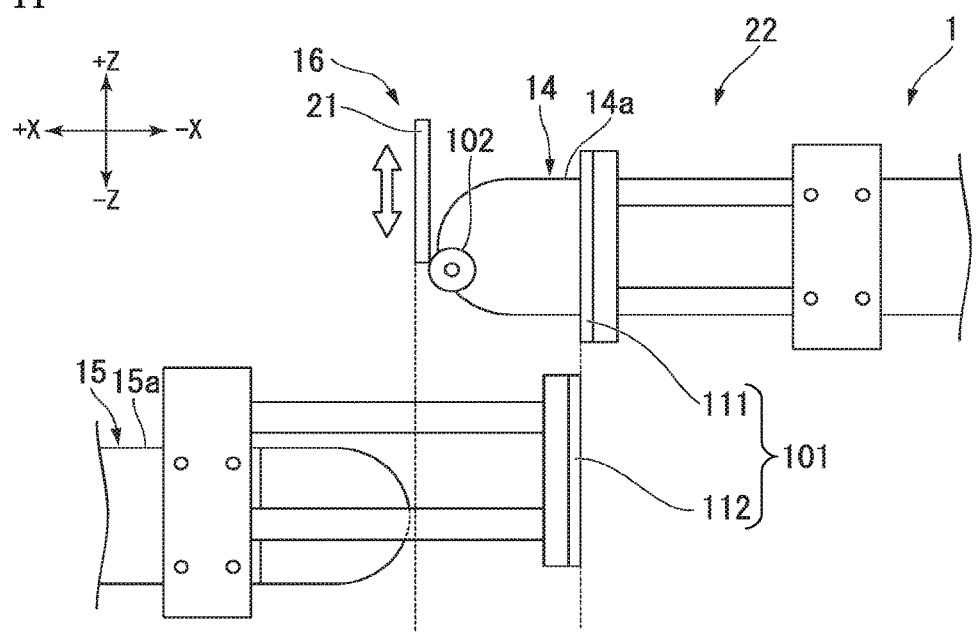
FIG. 11 is a partially enlarged side view showing a transporter according to a first modification example of the fourth embodiment.

FIG. 11 is a partially enlarged side view showing the transporter 1 according to a first modification example.

As shown in FIG. 11, the center of the second proximity sensor component 112 in the Z-direction may be located at a position shifted in the +Z-direction, with respect to the center of the second conveyor 15 in the Z-direction. According to the present modification example, if the upper surface 15a of the second conveyor 15 is higher than the upper surface 14a of the first conveyor 14, the actuator 102 starts to move the restrainer 21 from the restraining position P1 toward the releasing position P2 when the distance in the Z-direction between the upper surface 15a of the second conveyor 15 and the upper surface 14a of the first conveyor 14 becomes shorter than the first distance. On the other hand, if the upper surface 15a of the second conveyor 15 is lower than the upper surface 14a of the first conveyor 14, the actuator 102 starts to move the restrainer 21 from the restraining position P1 toward the releasing position P2 when the distance in the Z-direction between the upper surface 15a of the second conveyor 15 and the upper surface 14a of the first conveyor 14 becomes shorter than the second distance that is longer than the first distance. In this manner, it is possible to realize an operation effect which is substantially the same as that according to the first modification example of the first embodiment. Similarly to the first modification example of the first embodiment, both the upper edge and the lower edge of the second proximity sensor component 112 may not be disposed at the position shifted in the +Z-direction.

Instead of the above-described configuration, similarly to the second modification example of the first embodiment, the center of the first proximity sensor component 111 in the Z-direction may be disposed at a position shifted in the −Z-direction, with respect to the center of the first conveyor 14 in the Z-direction. In this manner, it is possible to realize an operation effect which is substantially the same as that according to the above-described first modification example.

Second Modification Example

Figure 12:
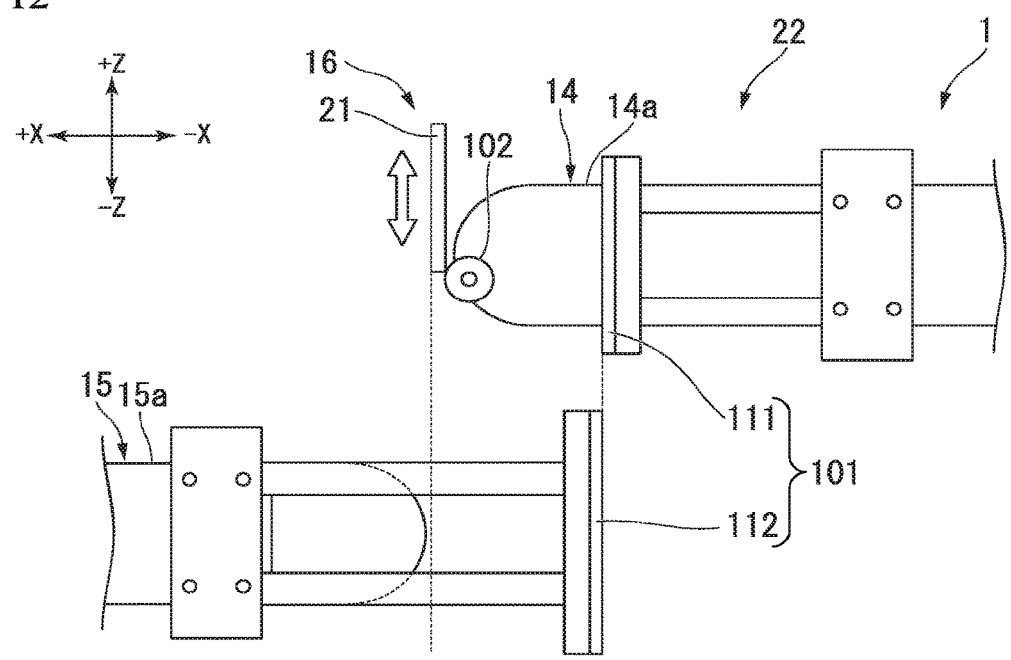
FIG. 12 is a partially enlarged side view showing a transporter according to a second modification example of the fourth embodiment.

FIG. 12 is a partially enlarged side view showing the transporter 1 according to a second modification example.

As shown in FIG. 12, in the present modification example, the width of the second proximity sensor component 112 in the Z-direction is wider than the width of the second proximity sensor component 112 in the Z-direction according to the fourth embodiment. In this manner, it is possible to lengthen a period during which the restrainer 21 moves to the releasing position P2. In this manner, it is possible to realize an operation effect which is substantially the same as that according to the third modification example of the first embodiment.

Instead of the above-described configuration, similarly to the fourth modification example of the first embodiment, the width of the first proximity sensor component 111 in the Z-direction may be wider than the width of the first proximity sensor component 111 in the Z-direction according to the fourth embodiment. In this manner, it is possible to realize an operation effect which is substantially the same as that according to the above-described second modification example.

Figure 13:
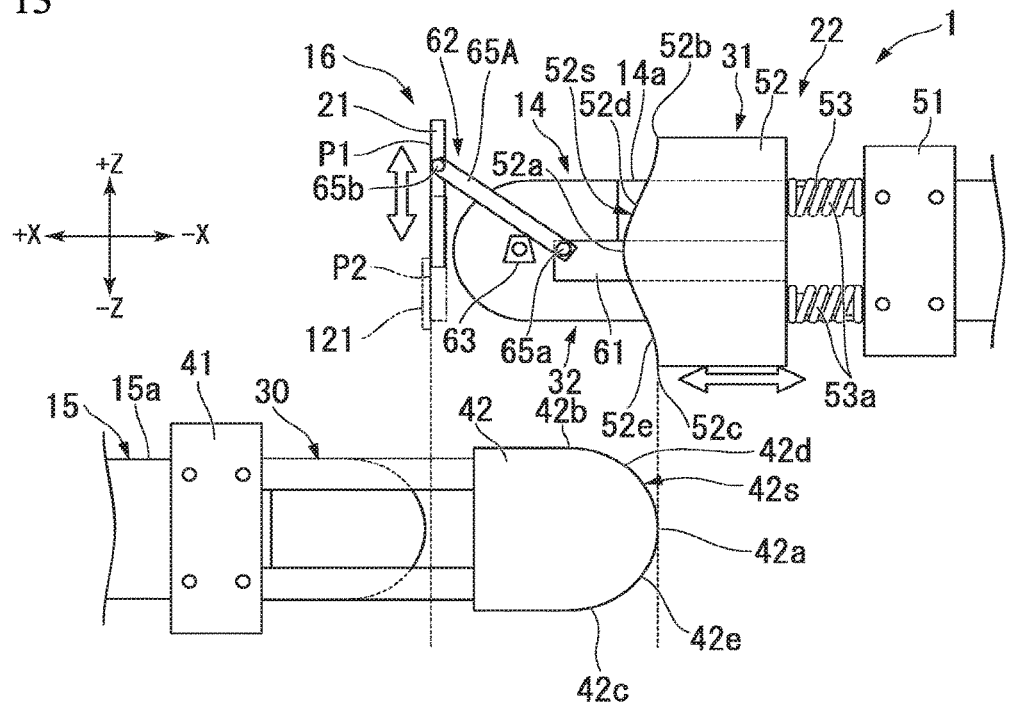
FIG. 13 is a partially enlarged side view showing a transporter according to a modification example of the embodiments.

Hitherto, some embodiments and modification examples have been described. However, the configuration of the transporter 1 is not limited to the above-described examples. For example, FIG. 13 shows a modification example of the transporter 1. As shown in FIG. 13, for example, instead of the above-described examples, the linkage 32 may include the slide member 61, the link 62, the link supporter 63, and a guide 121. For example, the link 62 may be formed using only one link member 65A. The link member 65A rides on the link supporter 63. In this manner, the link supporter 63 supports the link member 65A from below. The guide 121 comes into contact with the restrainer 21, thereby maintaining the posture of the restrainer 21. In this manner, even in a case where the link 62 is formed using only one link member 65A, the posture of the restrainer 21 can be stabilized, and the restrainer 21 is movable between the restraining position P1 and the releasing position P2.

Figure 14:
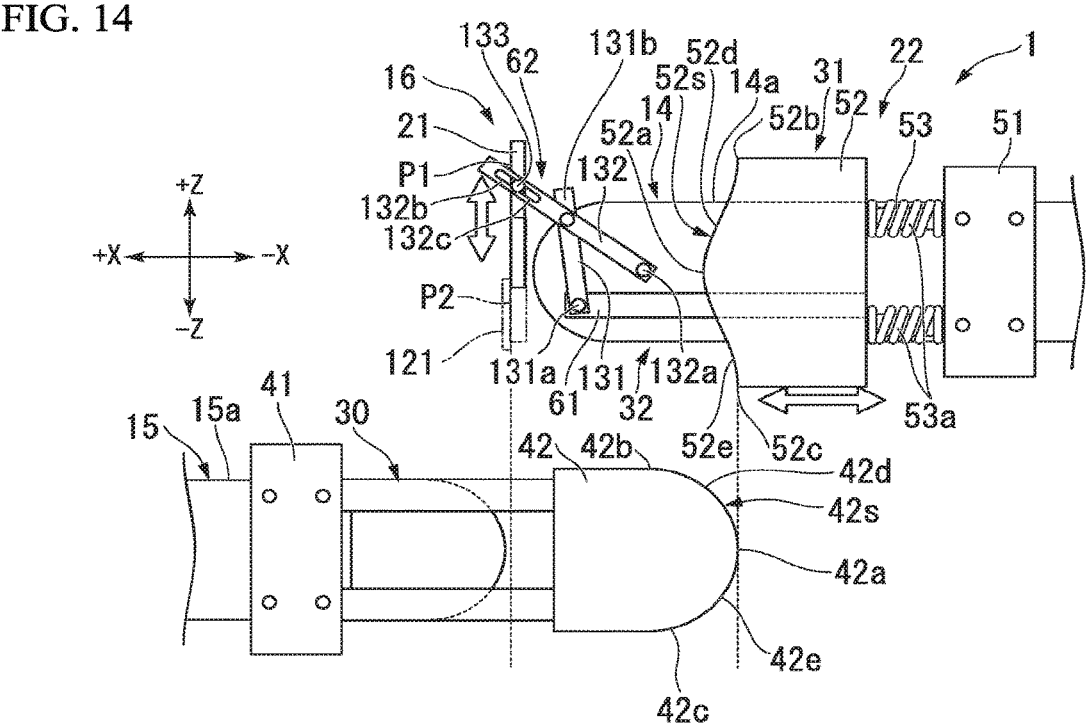
FIG. 14 is a partially enlarged side view showing a transporter according to another modification example of the embodiments.

FIG. 14 shows another modification example of the transporter 1. As shown in FIG. 14, for example, instead of the above-described examples, the linkage 32 may include the slide member 61, the link 62, and the guide 121. According to the present modification example, the link 62 includes a first link member 131 and a second link member 132. The first link member 131 includes a first end 131a pivotably coupled with the slide member 61, and a second end 131b pivotably coupled with the second link member 132. The first link member 131 swings around the first end 131a as a swing center in accordance with the movement of the slide member 61 in the +X-direction and the −X-direction. On the other hand, the second link member 132 includes a first end 132a pivotably coupled with the frame portion of the first conveyor 14, and a second end 132b pivotably coupled with the restrainer 21. More specifically, a long hole 132c is provided in the second end 132b of the second link member 132. The restrainer 21 is supported by a pin 133 inserted into the long hole 132c. In accordance with the swinging of the first link member 131, the second link member 132 moves the restrainer 21 between the restraining position P1 and the releasing position P2.

However, these modification examples are merely examples of the restrainer moving unit 22. A four-link mechanism or other various link mechanisms can be appropriately applied to a link mechanism for moving the restrainer 21. In addition, the restrainer moving unit 22 may be formed using a configuration other than the link mechanism (e.g., a configuration in which a plurality of members are in contact with each other or perform expansion/contraction).

According to at least one embodiment described above, it is possible to achieve improved transport efficiency by providing the restrainer which is moved in a case where the position of the conveyor relative to the object-transporting destination is in the preset range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transporter comprising:

a conveyor that conveys an object in a first direction, the conveyor being movable in a second direction, the second direction being different from the first direction;

a restrainer disposed corresponding to a downstream end of the conveyor in the first direction, the restrainer being supported by the conveyor and movable in the second direction together with the conveyor; and a restrainer moving unit that keeps, in a case where a position of the conveyor, in the second direction, relative to an object-transporting destination is out of a preset range, the restrainer at a restraining position at which the restrainer restrains a movement of the object, and the restrainer moving unit that starts to move, in a case where the position of the conveyor, in the second direction, relative to the object-transporting destination is in the preset range, the restrainer toward a releasing position at which the restrainer allows the movement of the object.

2. The transporter according to claim 1, wherein the restrainer moving unit comprises a first arm, a second arm, and a linkage, the first arm is to be on the object-transporting destination, the second arm is moved by the first arm by coming into contact with the first arm in the case where the position of the conveyor, in the second direction, relative to the object-transporting destination is in the preset range, and the linkage links the second arm to the restrainer.

3. The transporter according to claim 2, wherein the first arm has a first contact surface, and the first contact surface has a first convex shape, the second arm comprises a movable member and a passive deformable mechanism, the movable member has a second contact surface, the second contact surface has a second convex shape and comes into contact with the first contact surface in the case where the position of the conveyor, in the second direction, relative to the object-transporting destination is in the preset range, and the passive deformable mechanism allows the movable member to be retreated by the first arm pushing the movable member in a case where the first contact surface and the second contact surface come into contact with each other, and the linkage links the movable member to the restrainer.

4. The transporter according to claim 3, wherein the linkage comprises a slide member and a link, the slide member is moved together with the movable member, and the link is pivotably connected to the slide member and the restrainer to allow the restrainer to be moved toward the releasing position in a case where the slide member is moved in a direction away from the first arm.

5. The transporter according to claim 3, wherein the linkage comprises a slide member, and the slide member is moved together with the movable member, and the slide member has a slope surface, the slope surface is under the restrainer and supports the restrainer, the slope surface has a declining direction, and the declining direction is substantially parallel to a direction from the second arm to the first arm in a state where the first arm and the second arm are in contact with each other.

6. The transporter according to claim 2, wherein
the second arm is rotated by coming into contact with the first arm,
the linkage comprises a slide member and a conversion mechanism, and the conversion mechanism converts a rotation of the second arm into a linear movement of the slide member, and
the slide member has a slope surface, the slope surface is under the restrainer and supports the restrainer, the slope surface has a declining direction, and the declining direction is substantially parallel to a direction from the second arm to the first arm in a state where the first arm and the second arm are in contact with each other.

7. The transporter according to claim 1, wherein
the object-transporting destination has an object-transporting destination position,
the restrainer moving unit starts to move the restrainer toward the releasing position in a case where the object-transporting destination position is higher than an upper surface of the conveyor when a distance in the second direction between the object-transporting destination position and the upper surface of the conveyor becomes shorter than a first reference distance, and
the restrainer moving unit starts to move the restrainer toward the releasing position in a case where the object-transporting destination position is lower than the upper surface of the conveyor when the distance in the second direction between the object-transporting destination position and the upper surface of the conveyor becomes shorter than a second reference distance that is longer than the first reference distance.

8. The transporter according to claim 1, wherein
the restrainer moving unit comprises a sensor and an actuator, the sensor detects that the position of the conveyor, in the second direction, relative to the object-transporting destination is in the preset range, and the actuator starts to move the restrainer based on a detection result of the sensor.

9. The transporter according to claim 8, wherein
the object-transporting destination has an object-transporting destination position,
the actuator starts to move the restrainer toward the releasing position in a case where the object-transporting destination position is higher than an upper surface of the conveyor when a distance in the second direction between the object-transporting destination position and the upper surface of the conveyor becomes shorter than a first reference distance, and
the actuator starts to move the restrainer toward the releasing position in a case where the object-transporting destination position is lower than the upper surface of the conveyor when the distance in the second direction between the object-transporting destination position and the upper surface of the conveyor becomes shorter than a second reference distance that is longer than the first reference distance.

10. The transporter according to claim 1, further comprising:
an information acquiring unit that acquires information relating to a position of the object;
a holder for holding the object; and
a holder moving unit that moves the holder to an object-transporting departure based on the information acquired by the information acquiring unit, the holder moving unit that moves the holder toward the conveyor while the holder holds the object.

11. The transporter according to claim 10, wherein
the object-transporting destination is a second conveyor, and the second conveyor conveys the object in the first direction, and
the holder moving unit moves the holder for holding another object that is in the object-transporting departure while the second conveyor transports the object.

12. The transporter according to claim 1, wherein
the conveyor has a transport surface on which the object is placed, the conveyor moves the transport surface in the first direction in the case where the position of the conveyor, in the second direction, relative to the object-transporting destination is out of the preset range while the restrainer moving unit keeps the restrainer at the restraining position.

13. The transporter according to claim 1, wherein
the restrainer moving unit starts to move, in the case where the position of the conveyor, in the second direction, relative to the object-transporting destination is in the preset range by the conveyor moving down toward substantially the same height as the object-transporting destination, and
the restrainer moving unit starts to move, in the case where the position of the conveyor, in the second direction, relative to the object-transporting destination is in the preset range by the conveyor moving up toward substantially the same height as the object-transporting destination.

14. The transporter according to claim 1, wherein
the restrainer moving unit comprises a first member and a second member, the first member is to be on the object-transporting destination, the second member is provided on the conveyor and comes in contact with the first member in the case where the position of the conveyor, in the second direction, relative to the object-transporting destination is in the preset range.

15. A transport method for a transporter, the transporter comprising a conveyor that conveys an object in a first direction, the conveyor being movable in a second direction, the second direction being different from the first direction, the method comprising:
keeping, in a case where a position of the conveyor relative to an object-transporting destination is out of a preset range, a restrainer that is disposed corresponding to a downstream end of the conveyor in the first direction at a restraining position at which the restrainer restrains a movement of the object, the restrainer being supported by the conveyor and movable in the second direction together with the conveyor; and
starting to move, in a case where the position of the conveyor relative to the object-transporting destination is in the preset range, the restrainer toward a releasing position at which the restrainer allows the movement of the object.

16. The transport method according to claim 15, wherein
starting to move the restrainer toward the releasing position comprises:
causing a first arm and a second arm to come into contact with each other, the first arm is provided on the object-transporting destination, and the second arm is provided on the conveyor and is moved by the first arm by coming into contact with the first arm; and
causing the restrainer to be moved by a linkage that links the second arm to the restrainer.

17. The transport method according to claim 16, wherein
causing a first arm and a second arm to come into contact with each other comprise:

causing a first contact surface of the first arm and a second contact surface of the second arm to come into contact with each other, the first contact surface has a first convex shape, and the second contact surface has a second convex shape.

18. The transport method according to claim 17, wherein causing a first arm and a second arm to come into contact with each other further comprise:
deforming a passive deformable mechanism to allow a movable member of the second arm to be retreated by the first arm pushing the movable member.

19. A transporter comprising:
a conveyor that conveys an object in a first direction, the conveyor being movable in a second direction, the second direction being different from the first direction;
a restrainer disposed corresponding to a downstream end of the conveyor in the first direction; and
a restrainer moving unit that keeps, in a case where a position of the conveyor, in the second direction, relative to an object-transporting destination is out of a preset range, the restrainer at a restraining position at which the restrainer restrains a movement of the object, and the restrainer moving unit that starts to move, in a case where the position of the conveyor, in the second direction, relative to the object-transporting destination is in the preset range, the restrainer toward a releasing position at which the restrainer allows the movement of the object,
wherein
the restrainer moving unit comprises a first arm, a second arm, and a linkage, the first arm is to be on the object-transporting destination, the second arm is moved by the first arm by coming into contact with the first arm in the case where the position of the conveyor, in the second direction, relative to the object-transporting destination is in the preset range, and the linkage links the second arm to the restrainer.

* * * * *